United States Patent
Goh et al.

(10) Patent No.: US 12,373,015 B2
(45) Date of Patent: Jul. 29, 2025

(54) SYSTEM AND METHOD FOR A POWER SUSTAINABILITY MOUSE WITH CLICK HAPTIC SOLENOID ENERGY HARVESTER DEVICE

(71) Applicant: Dell Products, LP, Round Rock, TX (US)

(72) Inventors: Peng Lip Goh, Singapore (SG); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 120 days.

(21) Appl. No.: 18/378,273

(22) Filed: Oct. 10, 2023

(65) Prior Publication Data

US 2025/0117061 A1    Apr. 10, 2025

(51) Int. Cl.
| | |
|---|---|
| *G06F 1/3231* | (2019.01) |
| *G06F 1/3215* | (2019.01) |
| *G06F 3/01* | (2006.01) |
| *G06F 3/03* | (2006.01) |
| *G06F 3/0354* | (2013.01) |
| *H02J 50/00* | (2016.01) |

(52) U.S. Cl.
CPC .......... *G06F 1/3231* (2013.01); *G06F 1/3215* (2013.01); *G06F 3/016* (2013.01); *G06F 3/0304* (2013.01); *G06F 3/03543* (2013.01); *H02J 50/001* (2020.01)

(58) Field of Classification Search
CPC ..... G06F 1/3231; G06F 1/3215; G06F 1/1669
See application file for complete search history.

(56) References Cited

U.S. PATENT DOCUMENTS

| | | | |
|---|---|---|---|
| 5,838,138 A * | 11/1998 | Henty | G06F 3/0338 |
| | | | 320/135 |
| 11,368,044 B2 | 6/2022 | Wale | |
| 11,621,578 B2 | 4/2023 | Wale | |
| 2001/0010513 A1 | 8/2001 | Rosenberg | |

(Continued)

FOREIGN PATENT DOCUMENTS

| | | |
|---|---|---|
| EP | 3257591 B1 | 12/2019 |
| WO | 2015/015523 A1 | 2/2015 |
| WO | 2021/236334 A1 | 11/2021 |

*Primary Examiner* — Raymond N Phan
(74) *Attorney, Agent, or Firm* — Prol Intellectual Property Law, PLLC; H. Kenneth Prol

(57) ABSTRACT

A wireless mouse operatively coupled to an information handling system including a wireless mouse microcontroller and a wireless mouse power management unit (PMU) to provide power to the wireless mouse microcontroller and the wireless mouse PMU operatively coupled to a battery and an ultracapacitor. The wireless mouse further comprising a click haptic solenoid energy harvester device placed under a wireless mouse button with a striking arm to interface with a mouse button plate when the wireless mouse button is pressed down, the striking arm urging a magnet through the wire coil when the wireless mouse button is pressed down to change the ultracapacitor. The wireless mouse microcontroller determines when the wireless mouse is in a standby mode based on input from an actuation/engagement sensor and, with the wireless mouse PMU, switch a power source from a battery to the ultracapacitor when the wireless mouse is in the standby mode.

20 Claims, 7 Drawing Sheets

(56) References Cited

U.S. PATENT DOCUMENTS

| | | | |
|---|---|---|---|
| 2002/0118173 A1* | 8/2002 | Nacson | G06F 3/03543 345/163 |
| 2006/0256075 A1* | 11/2006 | Anastas | G06F 3/016 345/156 |
| 2006/0267944 A1 | 11/2006 | Rosenberg | |
| 2008/0158157 A1* | 7/2008 | Chang | G06F 3/03543 345/163 |
| 2015/0288193 A1* | 10/2015 | Crosby | H02J 50/10 307/104 |
| 2016/0041634 A1* | 2/2016 | Weng | H02K 7/1853 345/163 |
| 2019/0074712 A1 | 3/2019 | Liang | |
| 2021/0367445 A1 | 11/2021 | Wale | |
| 2022/0093303 A1 | 3/2022 | Vlasov | |
| 2022/0176240 A1* | 6/2022 | Aurongzeb | A63F 13/285 |
| 2022/0320891 A1 | 10/2022 | Wale | |

\* cited by examiner

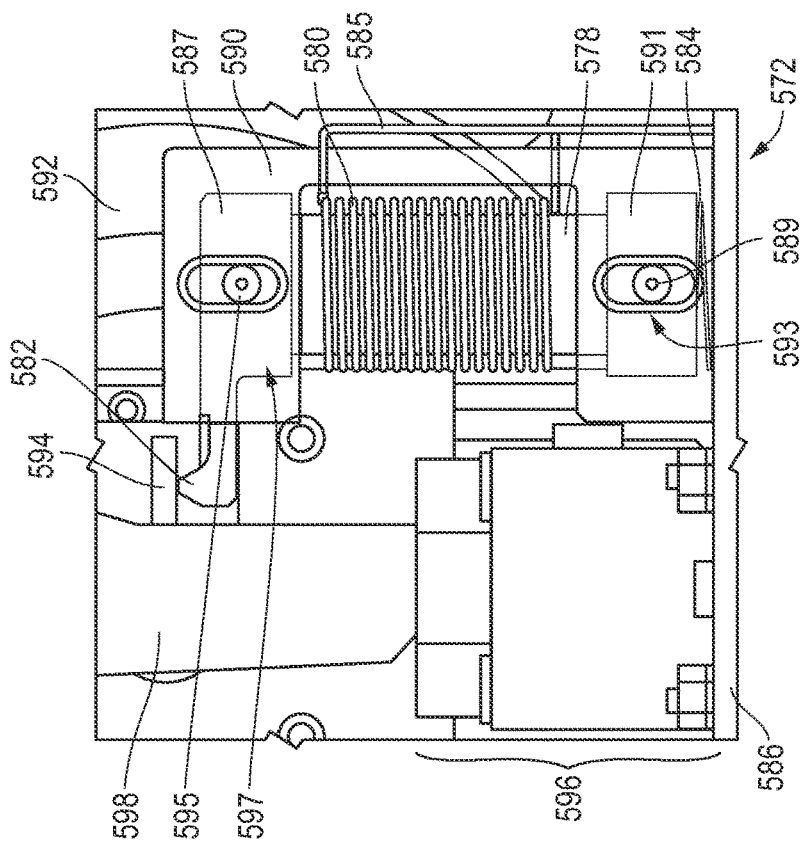
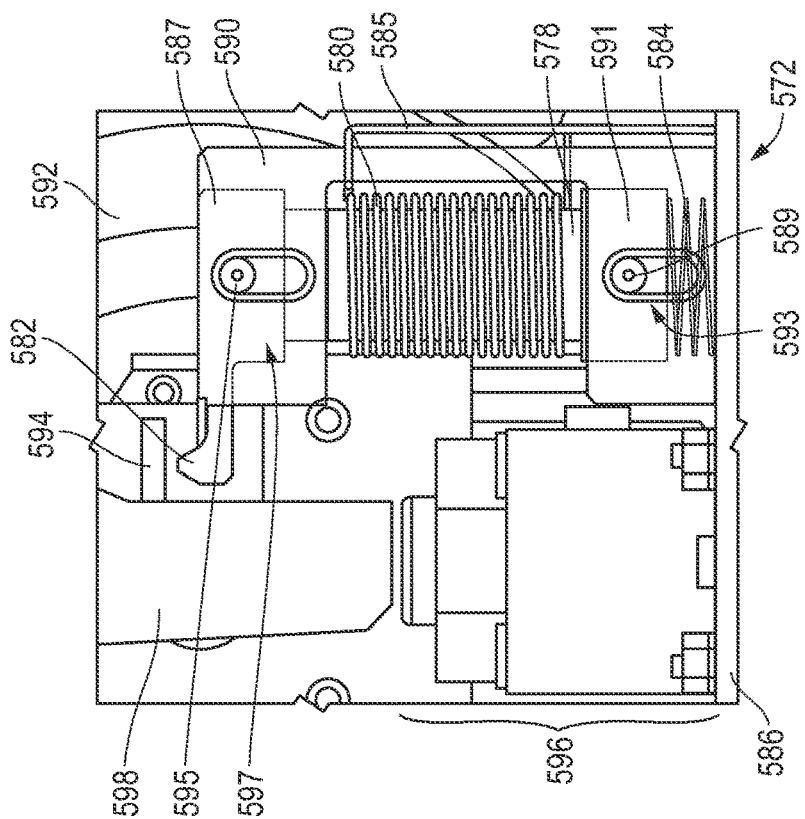
FIG. 5A
FIG. 5B

SYSTEM AND METHOD FOR A POWER SUSTAINABILITY MOUSE WITH CLICK HAPTIC SOLENOID ENERGY HARVESTER DEVICE

FIELD OF THE DISCLOSURE

The present disclosure generally relates to a wireless mouse. The present disclosure more specifically relates to a wireless mouse that includes an ultracapacitor that is charged, while the wireless mouse is not in a standby mode, via a click haptic solenoid energy harvester device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more gaming applications. Further, the information handling system may include any number of wireless peripheral devices including a wireless mouse used to provide input to and receive output from the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5A is a side view of a click haptic solenoid energy harvester formed within a housing of a wireless mouse and operating relative to a mouse button plate formed with a wireless mouse button in an unpressed position according to an embodiment of the present disclosure;

FIG. 5B is a side view of a click haptic solenoid energy harvester formed within a housing of a wireless mouse and operatively relative to the mouse button plate formed with the wireless mouse button in a pressed position according to another embodiment of the present disclosure;

The use of the same reference symbols in different drawings may indicate similar or identical items.

DETAILED DESCRIPTION OF THE DRAWINGS

Figure 1:
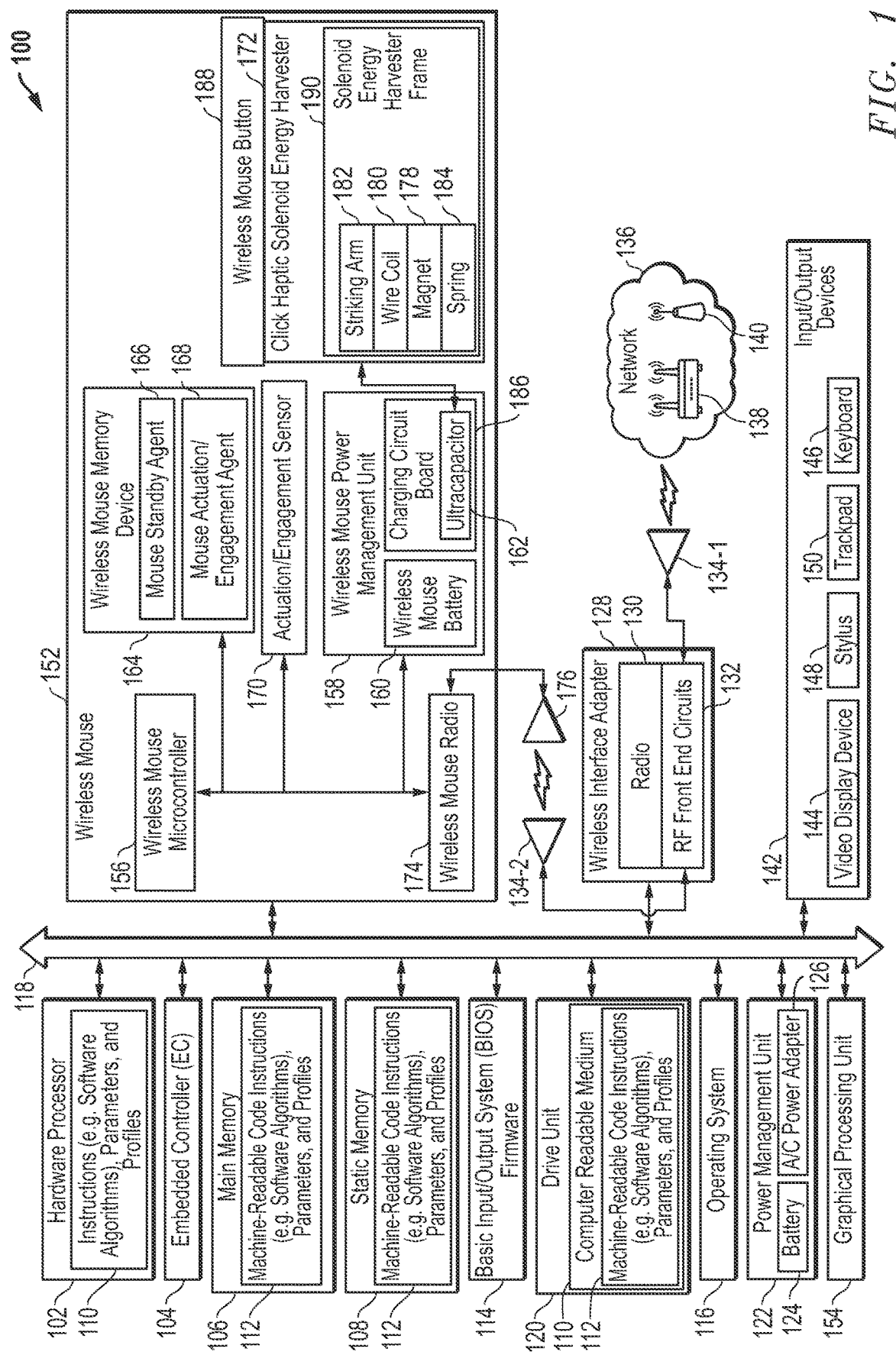
FIG. 1 is a block diagram illustrating an information handling system with a wireless mouse and a click haptic energy harvester device according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems include input/output I/O devices that allow a user to interface with the information handling system. Some of these I/O devices may be wireless I/O devices that transceive data to and from the wireless I/O device. Specifically, a wireless mouse may communicate cursor movement and mouse button actuation data to the information handling system as the user actuates one or more mouse buttons of the wireless mouse as well as move the wireless mouse across a surface. However, because the wireless mouse is continuously communicating with the information handling system regardless of whether input at the wireless mouse is received from a user, the wireless mouse will consume power even where a standby mode is activated. The power source is often a battery. However, with the wireless mouse constantly being powered on even in a standby mode, the battery is drained of power. This causes the user to have to constantly replace or recharge the battery that may be depleted relatively often. This leads to significant costs associated with battery replacement. Additionally, because the battery has to be recharged frequently and replaced more frequently, the disposal of the batteries may increase damage to the environment even if they are disposed of properly by the user.

The present specification describes a wireless mouse operatively coupled to an information handling system that includes a wireless mouse microcontroller and a wireless mouse power management unit (PMU) to provide power to the wireless mouse microcontroller and the wireless mouse PMU operatively coupled to a battery and an ultracapacitor.

The wireless mouse further includes a click haptic solenoid energy harvester device operatively coupled to the wireless mouse PMU and placed under a mouse button of the wireless mouse, the click haptic solenoid energy harvester device comprising a wire coil with a magnet placed within the wire coil and a striking arm to interface with a mouse button plate formed on the mouse button when the mouse button is pressed down, the striking arm forcing the magnet through the wire coil when the mouse button and its mouse button plate are pressed down. A mouse actuation/engagement agent may, when executed by the wireless mouse microcontroller, determine input has not been received for a time period for determining a standby mode. The mouse actuation/engagement agent may also determine when input has been received at the wireless mouse such as when the wireless mouse has been moved based on input from an actuation/engagement sensor and, with the wireless mouse PMU, maintain a power source at a battery when the wireless mouse is not placed in a standby mode.

In an embodiment, a mouse standby agent, when executed by the wireless mouse microcontroller, determines when a threshold time period has expired since a user has last interacted with the mouse based on a history of the wireless mouse engagement data received by the mouse actuation/engagement agent from the wireless mouse microcontroller to place the wireless mouse in a standby mode and to power the wireless mouse using the ultracapacitor. This allows the wireless mouse to dynamically switch from operating under the power of a battery to the power provided by the ultracapacitor such that actuation of a mouse button by a user is used to later power the wireless mouse when in standby mode. This reduces the power drained at the battery thereby reducing the necessity to replace the battery. This further reduces the environmental impact of the use of the wireless mouse due to the frequency of battery disposal being reduced.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 138, a base station transceiver 140, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 106, (volatile (e.g., random-access memory, etc.), or static memory 108, nonvolatile (read-only memory, flash memory etc.) or any combination thereof), one or more hardware processing resources, such as a hardware processor 102 that may be a central processing unit (CPU), a graphics processing unit (GPU) 154, embedded controller (EC) 104, or any combination thereof. Additional components of the information handling system 100 may include one or more storage devices such as static memory 108 or drive unit 120. The information handling system 100 may include or interface with one or more communications ports for communicating with external devices, as well as various input and output (I/O) devices 142, such as a wireless mouse 152 described in embodiments herein, a trackpad 150, a keyboard 146, a stylus 148, a video/graphics display device 144, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 112 that may operate on servers or systems, remote data centers, or on-box in individual client information handling systems according to various embodiments herein. In some embodiments, it is understood any or all portions of instructions (e.g., software algorithms), parameters, and profiles 112 may operate on a plurality of information handling systems 100.

The information handling system 100 may include the hardware processor 102 such as a central processing unit (CPU). Any of the processing resources may operate to execute code that is either firmware or software code. Moreover, the information handling system 100 may include memory such as main memory 106, static memory 108, and disk drive unit 120 (volatile (e.g., random-access memory, etc.), nonvolatile memory (read-only memory, flash memory etc.) or any combination thereof or other memory with computer readable medium 110 storing instructions (e.g., software algorithms), parameters, and profiles 112 executable by the EC 104, hardware processor 102, GPU 154, or any other processing device. The information handling system 100 may also include one or more buses 118 operable to transmit communications between the various hardware components such as any combination of various I/O devices 142 as well as between hardware processors 102, an EC 104, the operating system (OS) 116, the basic input/output system (BIOS) 114, the wireless interface adapter 128, or a radio module, among other components described herein. In an embodiment, the information handling system 100 may be in wired or wireless communication with the I/O devices 142 such as a keyboard 146, a wireless mouse 152, video display device 144, stylus 148, or trackpad 150 among other peripheral devices.

The information handling system 100 further includes a video/graphics display device 144. The video/graphics display device 144 in an embodiment may function as a liquid crystal display (LCD), an organic light emitting diode (OLED), a flat panel display, or a solid-state display. Additionally, as described herein, the information handling system 100 may include one or more other I/O devices 142 including the wireless mouse 152 described herein that allows the user to interface with the information handling system 100 via the video/graphics display device 144, a cursor control device (e.g., a trackpad 150, or gesture or touch screen input), a stylus 148, and/or a keyboard 146, among others. Various drivers and control electronics may be operatively coupled to operate the I/O devices 142 according to the embodiments described herein. The present specification contemplates that the I/O devices 142 may be wired or wireless. In the context of the wireless mouse 152 described herein, the wireless mouse 152 is operatively coupled to the information handling system 100 via a wireless connection using a wireless mouse radio 174 and wireless mouse antenna 176.

A network interface device of the information handling system 100 shown as wireless interface adapter 128 can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In embodiments described herein, the wireless interface device 128 with its radio 130, RF front end 132 and antenna 134-2 is used to communicate with the wireless mouse 152 via, for example, a Bluetooth® or Bluetooth® Low Energy (BLE) protocols at, for example, 2.4 GHz or 6 GHZ frequencies. In an embodiment, the WAN, WWAN, LAN, and WLAN may each include an AP 138 or base station 140 used to operatively couple the information handling system 100 to a network 136. In a specific embodiment, the network 136 may include macro-cellular connections via one or more base stations 140 or a wireless AP 138 (e.g., Wi-Fi), or such as through licensed or unlicensed WWAN small cell base stations 140. Connectivity may be via wired or wireless connection. For example, wireless network wireless APs 138 or base stations 140 may be operatively connected to the information handling system 100. Wireless interface adapter 128 may include one or more radio frequency (RF) subsystems (e.g., radio 130) with transmitter/receiver circuitry, modem circuitry, one or more antenna radio frequency (RF) front end circuits 132, one or more wireless controller circuits, amplifiers, antennas 134-1, 134-2 and other circuitry of the radio 130 such as one or more antenna ports used for wireless communications via multiple radio access technologies (RATs). The radio 130 may communicate with one or more wireless technology protocols.

In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. The wireless interface adapter 128 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 112 or receives and executes instructions, parameters, and profiles 112 responsive to a propagated signal, so that a device connected to a network 136 may communicate voice, video, or data over the network 136. Further, the instructions 112 may be transmitted or received over the network 136 via the network interface device or wireless interface adapter 128.

The information handling system 100 may include a set of instructions 112 that may be executed to cause the computer system to perform any one or more of the methods or computer-based functions disclosed herein. For example, instructions 112 may be executed by a hardware processor 102, GPU 154, EC 104 or any other hardware processing resource and may include software agents, or other aspects or components used to execute the methods and systems described herein. Various software modules comprising application instructions 112 may be coordinated by an OS 116, and/or via an application programming interface (API). An example OS 116 may include Windows®, Android®, and other OS types. Example APIs may include Win 32, Core Java API, or Android APIs.

In an embodiment, the information handling system 100 may include a disk drive unit 120. The disk drive unit 120 and may include machine-readable code instructions, parameters, and profiles 112 in which one or more sets of machine-readable code instructions, parameters, and profiles 112 such as firmware or software can be embedded to be executed by the hardware processor 102 or other hardware processing devices such as a GPU 154 or EC 104, or other microcontroller unit to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of information handling system 100.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102 and other hardware components described herein. The PMU 122 may control power to one or more components including the one or more drive units 120, the hardware processor 102 (e.g., CPU), the EC 104, the GPU 154, a video/graphic display device 144, or other wired I/O devices 142 such as the stylus 148, a keyboard 146, and a trackpad 150 and other components that may require power when a power button has been actuated by a user. In an embodiment, the PMU 122 may monitor power levels and be electrically coupled to the information handling system 100 to provide this power. The PMU 122 may be coupled to the bus 118 to provide or receive data or machine-readable code instructions. The PMU 122 may regulate power from a power source such as the battery 124 or AC power adapter 126. In an embodiment, the battery 124 may be charged via the AC power adapter 126 and provide power to the components of the information handling system 100, via wired connections as applicable, or when AC power from the AC power adapter 126 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system is operatively coupled to a wireless mouse 152. The wireless mouse 152 may be used by a user to provide input to the information handling system 100 in the form of selection data via actuation of a wireless mouse button 188 on the mouse and/or cursor movement via movement of the wireless mouse 152 by the user. As described herein, the wireless mouse 152 includes a wireless mouse radio 174 and wireless mouse antenna 176 that is used to communicate with the information handling system 100 that, in embodiments herein, executes a wireless mouse driver that allows the communication between the information handling system 100 and the wireless mouse 152.

The wireless mouse 152 further includes a wireless mouse microcontroller 156. The wireless mouse microcontroller 156 may be any type of processing device that is capable of executing the machine-readable code instructions (e.g., firmware or software algorithms), parameters, and profiles such as the mouse standby agent 166 and mouse actuation/engagement agent 168 described herein. The computer readable program code of the mouse standby agent 166 and mouse actuation/engagement agent 168 may be accessed by the wireless mouse microcontroller 156 at a wireless mouse memory device 164 operatively coupled to the wireless mouse microcontroller 156. The wireless mouse microcontroller 156 may also receive input from, for example, an actuation/engagement sensor 170 used to determine an active state or a standby state for whether a power supply should be switched from an ultracapacitor 162 to a wireless mouse battery 160 or from a wireless mouse battery 160 to the ultracapacitor 162.

The wireless mouse 152 further includes a wireless mouse memory device 164. The wireless mouse memory device 164 may be used to store computer readable code of the mouse standby agent 166 and/or mouse actuation/engagement agent 168 as well as any data used by the wireless mouse microcontroller 156 to execute the systems and methods described herein.

The wireless mouse 152 also includes a wireless mouse PMU 158. The wireless mouse PMU 158 may include a hardware controller and executable machine-readable code instructions to manage the power provided to the components of the wireless mouse 152 such as the wireless mouse microcontroller 156, the actuation/engagement sensor 170, the wireless mouse memory device 164, and other hardware components described herein. In an embodiment, the wireless mouse PMU 158 may monitor power levels and be electrically coupled within the wireless mouse 152 to provide this power. The wireless mouse PMU 158 may be used, via operation of the wireless mouse microcontroller 156, to dynamically regulate power from power sources within the wireless mouse 152 such as the wireless mouse battery 160 and the ultracapacitor 162 described herein.

The wireless mouse 152 further includes a click haptic solenoid energy harvester device 172 operatively coupled to the ultracapacitor 162 such that actuation of the click haptic solenoid energy harvester device 172 creates an electrical charge used to charge the ultracapacitor 162. The wireless mouse microcontroller 156 and wireless mouse PMU 158 may coordinate the charging of the ultracapacitor 162 with the click haptic solenoid energy harvester device 172 as described herein when the user is engaging with the wireless mouse 152.

In an embodiment, the wireless mouse microcontroller 156 may execute the mouse actuation/engagement agent 168 to determine, with the actuation/engagement sensor 170, when a user's presence is at the wireless mouse 152 or the user interacts with the wireless mouse 152. Where execution of the mouse standby agent 166 determines that user interaction, engagement, and/or presence is not detected after a threshold time period, the wireless mouse microcontroller 156 may place the wireless mouse in a standby mode. As such, the wireless mouse microcontroller 156 determines, via execution of the mouse standby agent 166, whether the wireless mouse 152 is to be placed in a standby mode when no user presence is detected, such as when no actuation of the wireless mouse button 188 on the wireless mouse 152 has been detected, or when the wireless mouse 152 has not been detected to have moved by the user after the threshold time period. When placed in a standby mode, the wireless mouse 152 may be switched to power from the ultracapacitor 162 instead of the wireless mouse battery 160 thereby conserving the power within the wireless mouse battery 160 during non-use of the wireless mouse 152.

In an embodiment, the actuation/engagement sensor 170 operatively coupled to the wireless mouse microcontroller 156 may be any sensor that detects the user's presence at the wireless mouse 152 or detects the user interacting with the wireless mouse 152. By way of example, the actuation/engagement sensor 170 may be a triggering device that detects a user actuating any wireless mouse button 188 or a specific mouse button on the wireless mouse 152. For example, the actuation/engagement sensor 170 may include a light emitting diode (LED) optical movement tracking sensor, other movement tracking sensor (e.g., a trackball system), or an accelerometer motion detector to detect that a user has moved the wireless mouse 152. In an example embodiment, the actuation/engagement sensor 170 may include the wireless mouse button 188 that, when providing input to the wireless mouse microcontroller 156, indicates that the wireless mouse button 188 on the wireless mouse 152 has been pressed or actuated by a user. In an embodiment, the actuation/engagement sensor 170 may be a sensor that detects a user's interaction with the housing of the wireless mouse 152 such as a motion detector that detects motion near the wireless mouse 152 or movement of the wireless mouse 152. In an embodiment, the actuation/engagement sensor 170 may be a proximity sensor that emits an electromagnetic field or beam of electromagnetic radiation (e.g., infrared light) to detect changed in the field of the beam or a return signal bouncing off of an object such as the user.

When the actuation/engagement sensor 170 is triggered, data indicating as such is transmitted to the wireless mouse microcontroller 156. With this data the wireless mouse microcontroller 156 may cause the wireless mouse 152 to exit the standby mode if it is in standby mode. As a result of exiting the standby mode, the wireless mouse microcontroller 156, with the wireless mouse PMU 158, may cause the wireless mouse 152 to be powered using the wireless mouse battery 160 instead of the ultracapacitor 162. As described herein, the wireless mouse 152 may not be powered constantly by a wireless mouse battery 160 during standby mode thereby reducing the need to replace the wireless mouse battery 160. Additionally, while the wireless mouse 152 is not in standby mode, the ultracapacitor 162 is being charged via actuation of the click haptic solenoid energy harvester device 172 that has been placed under the wireless mouse button 188.

In an embodiment, the click haptic solenoid energy harvester device 172 may include a solenoid device that converts movement of the magnet 178 (e.g., a permanent magnet) through the wire coil 180 into an electrical charge having a current and voltage. In an embodiment, the magnet 178 and wire coil 180 of the click haptic solenoid energy harvester device 172 is placed under a wireless mouse button 188 where actuation of the wireless mouse button 188 by a user, during use of the wireless mouse 152, forces the magnet 178 through the wire coil 180. In an embodiment, a first end of the magnet 178, while passed into the wire coil 180, is operatively coupled to a striking arm 182 that interfaces with a mouse button plate formed on the wireless mouse button 188 and generates a haptic click. Additionally, a second end of the magnet 178 may be operatively engaged with a spring 184 such that the magnet 178 is forced back through the wire coil 180 when pressure on the wireless mouse button 188 is released. Additionally, the magnet 178, wire coil 180, striking arm 182, and spring 184 may be maintained under the wireless mouse button 188 by a click haptic solenoid energy harvester frame 190 that houses these components. This causes the magnet 178 to remain within the wire coil 180 but allows the magnet 178 to move through the wire coil 180 when the wireless mouse button 188 is actuated by a user. As the magnet 178 is moved through the wire coil 180, a current and voltage is created after every actuation of the wireless mouse button 188. This current and voltage is passed to, in an example embodiment, an ultracapacitor 162 formed on a charging circuit board 186 via a charging circuit. In an embodiment, the ends of the wire coil 180 may be electrically coupled to the ultracapacitor 162 via charging circuit board 186 such that this current and voltage may be used to charge the ultracapacitor 162 of the wireless mouse 152 when the wireless mouse 152 is in an active mode and not in a standby mode. Thus, during use of the wireless mouse 152, as the user actuates the wireless mouse button 188 this causes the magnet 178 to pass through the wire coil 180 of the click haptic solenoid energy harvester device 172 resulting in the current and voltage being created.

In order to increase the speed at which the ultracapacitor 162 is charged, plural click haptic solenoid energy harvester devices 174 may be placed under plural wireless mouse buttons 188. In an embodiment, a first click haptic solenoid energy harvester device 172 may be placed under a left wireless mouse button 188 while a second click haptic solenoid energy harvester device 172 may be placed under a right wireless mouse button 188. It is appreciated that, in some embodiments, a click haptic solenoid energy harvester device 172 may be placed under other wireless mouse buttons 188, where present, of the wireless mouse 152. In these embodiments, each of the wire coils 180 of each of these plurality of click haptic solenoid energy harvester devices 172 is operatively coupled to the charging circuit board 186 housing the ultracapacitor 162 such that each of the click haptic solenoid energy harvester devices 172 can charge the ultracapacitor 162 when the wireless mouse 152 is in an active mode and is not in standby mode.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
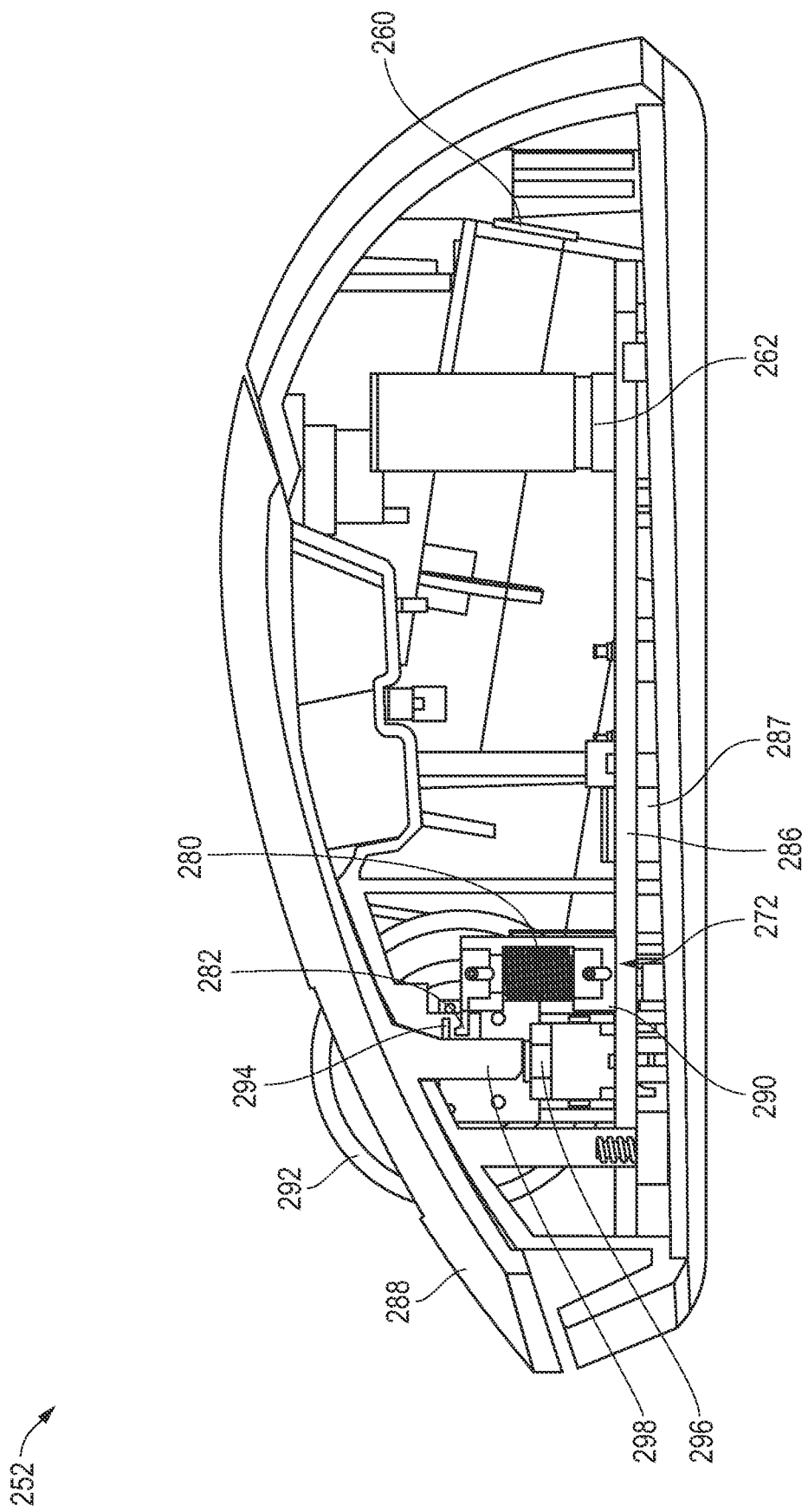
FIG. 2 is a side, cross-sectional view of a wireless mouse having an ultracapacitor and a click haptic solenoid energy harvester device formed into the wireless mouse according to an embodiment of the present disclosure.

FIG. 2 is a side, cross-sectional view of a wireless mouse 252 having an ultracapacitor 262 and a click haptic solenoid energy harvester device 272 formed into the wireless mouse according to an embodiment of the present disclosure. As described herein, the wireless mouse 252 includes one or more input devices that, in the embodiment shown in FIG. 2, may include a wireless mouse button 288 and a wireless mouse scrolling wheel 292. The wireless mouse button 288 may be used by a user to provide selection input describing objects selected on a graphical user interface (GUI) presented to a user on a video display device. The wireless mouse scrolling wheel 292 may be used by a user, in an embodiment, to scroll across the GUI presented to a user on the video display device. This input may be transmitted to an information handling system wirelessly using a wireless mouse radio and wireless mouse antenna formed within the housing of the wireless mouse 252. As described herein, the actuation/engagement sensor operatively coupled to the wireless mouse microcontroller may use this user input. The actuation/engagement sensor may be any sensor that detects the user's presence at the wireless mouse 252 or detects the user interacting with the wireless mouse 252. By way of example, the actuation/engagement sensor may be a triggering device that detects a user actuating movement of the wireless mouse, any wireless mouse button or a specific mouse button on the wireless mouse 252. In one example, the actuation/engagement sensor may include a light emitting diode (LED) optical movement tracking sensor or other movement tracking sensor to detect that a user has moved the wireless mouse 252. In another example embodiment, the actuation/engagement sensor may include the wireless mouse button 188 that, when providing input to the wireless mouse microcontroller, indicates that the wireless mouse button 288 on the wireless mouse 252 has been pressed or actuated by a user. In an embodiment, the actuation/engagement sensor may be a sensor that detects a user's interaction with the housing of the wireless mouse 252 such as a motion detector that detects motion near the wireless mouse 252 or capacitive touch sensor that detects a user's touch of the wireless mouse 252. In an embodiment, the actuation/engagement sensor may be a proximity sensor that emits an electromagnetic field or beam of electromagnetic radiation (e.g., infrared light) to detect changed in the field of the beam or a return signal bouncing off of an object such as the user.

The wireless mouse button 288 may include a mouse button arm 298 that extends below the wireless mouse button 288 to, when actuated by a user, contact a switch unit 296. The physical actuation of the switch unit 296 by the force imparted on it by the mouse button arm 298 causes the input to be received at the wireless mouse microcontroller (MCU) and provided, wirelessly, from the wireless mouse 252 to the information handling system via a wireless mouse radio and wireless mouse antenna as described herein.

As described herein, the mouse button arm 298 includes a mouse button plate 294. In an embodiment, the mouse button plate 294 extends out from the mouse button arm 298, generally, horizontally from the mouse button arm 298. As described herein, the mouse button plate 294 is used to interface, physically, with a striking arm 282 formed on the click haptic solenoid energy harvester device 272 in order to allow for the click haptic solenoid energy harvester device 272 to be activated thereby creating an electrical charge (e.g., at a voltage and current) to charge the ultracapacitor 262 and to generate haptic feedback at the wireless mouse button 288 when the mouse button plate 294 strikes the striking arm 282.

In an embodiment, the click haptic solenoid energy harvester device 272 may include a solenoid device that converts movement of the magnet (e.g., permanent magnet) (not shown) through the wire coil 280 into an electrical charge having a current and voltage. In an embodiment, the magnet and wire coil 280 of the click haptic solenoid energy harvester device 272 is placed under a wireless mouse button 288 where actuation of the wireless mouse button 288 and mouse button plate 294 by a user, during use of the wireless mouse 252, forces the magnet through the wire coil 280 via the striking arm 282.

In an embodiment, a first end of the magnet, while passed into the wire coil 280, is operatively coupled to a striking arm 282 that interfaces with a mouse button plate 294 formed on the wireless mouse button 288. In an embodiment, a top cap that includes the striking arm 282 may be placed above the magnet and operatively coupled to the top surface of the magnet using a fastener or adhesive such as a screw, a nail, glue and the like. A second end of the magnet may be operatively engaged with a spring (not shown) such that the magnet is forced back through the wire coil 280 when pressure on the wireless mouse button 288 is released. In an embodiment, the second end of the magnet may be operatively coupled to a bottom cap that interfaces with the spring used to force the magnet upwards when pressure on the wireless mouse button 288 is released by the user. Each of the top cap and bottom cap may include cap fingers that interface with a click haptic solenoid energy harvester frame 290 used to hold the top cap, bottom cap, spring, magnet and striking arm 282 in place under the wireless mouse button 288 and its mouse button plate 294. The click haptic solenoid energy harvester frame 290 causes the magnet to remain within the wire coil 280 but allows the magnet 278 to move through the wire coil 280 when the wireless mouse button 288 is actuated by a user.

Additionally, the wire coil 280 is wrapped around a portion of the magnet such that the wire coil 280 does not interfere with the movement of the magnet as described herein. As the magnet is moved through the wire coil 280, a current and voltage is created after every actuation of the wireless mouse button 288. This current and voltage is passed to, in an example embodiment, an ultracapacitor 262 formed on a charging circuit board 286 via charging circuitry. In an embodiment, the ends of the wire coil 280 may be electrically coupled to the ultracapacitor 262 and charging circuit board 286 such that this current and voltage may be used to charge the ultracapacitor 262 of the wireless mouse 252 when the wireless mouse 252 is actively being used and not in a standby mode. In an embodiment, the charging circuit board 286 may be or form part of a printed circuit board formed within the housing of the wireless mouse 252 and used for other circuit components of the wireless mouse 252 such as the wireless mouse microcontroller (not shown).

Additionally, as described herein, the wireless mouse microcontroller may execute computer readable program code of a mouse standby agent and mouse actuation/engagement agent. Execution of the mouse standby agent and mouse actuation/engagement agent allows the wireless mouse microcontroller to determine between an active mode and a standby mode for when to switch from powering the wireless mouse 252 via the ultracapacitor 262 to powering the wireless mouse 252 with a wireless mouse battery 260. In an embodiment, the wireless mouse microcontroller may execute the mouse actuation/engagement agent to determine, with the actuation/engagement sensor (e.g., optical tracking movement sensor 287 or switch unit 296), when a user's presence is at of the wireless mouse 252, or the user interacts with the wireless mouse 252. Where execution of the mouse standby agent determines that user interaction, engagement, and/or presence is not detected within a threshold time period, the wireless mouse microcontroller may place the wireless mouse in a standby mode. As such, the wireless mouse microcontroller determines, via execution of the mouse standby agent, whether the wireless mouse 252 is to be placed in a standby mode when no user presence or actuation is detected, when no actuation of the wireless mouse button 288 on the wireless mouse 252 is detected, or when the wireless mouse 252 has not been detected to have moved by the user within the threshold time period. When placed in a standby mode, the wireless mouse microcontroller may cause the wireless mouse 252, via the mouse PMU, to be powered by the ultracapacitor 262 instead of the wireless mouse battery 260 thereby conserving the power within the wireless mouse battery 260 during non-use of the wireless mouse 252.

In an embodiment, the actuation/engagement sensor (e.g., an optical tracking movement sensor 287 or switch unit 296) operatively coupled to the wireless mouse microcontroller may be any sensor that detects the user's presence at the wireless mouse 252 or that detects the user interacting with the wireless mouse 252. For example, the actuation/engagement sensor may include an LED optical movement tracking sensor 287, other movement tracking sensor, or accelerometer or other movement sensor to detect that a user has moved the wireless mouse 252. In another example, the actuation/engagement sensor may be a triggering device that detects a user actuating any wireless mouse button 288 or a specific mouse button on the wireless mouse 252. For example, the actuation/engagement sensor may include the switch unit 296 of the wireless mouse button 288 that, when providing input to the wireless mouse microcontroller 256, also indicates that the wireless mouse button 288 on the wireless mouse 252 has been pressed or actuated by a user. In an embodiment, the actuation/engagement sensor may be a sensor that detects a user's other interaction with the housing of the wireless mouse 252 such as a motion detector that detects motion near the wireless mouse 252. In an embodiment, the actuation/engagement sensor may be a proximity sensor that emits an electromagnetic field or beam of electromagnetic radiation (e.g., infrared light) to detect changed in the field of the beam or a return signal bouncing off of an object such as the user.

In order to increase the speed at which the ultracapacitor 262 is charged, plural click haptic solenoid energy harvester devices 274 may be placed under plural wireless mouse buttons 288 such as under both a right-click wireless mouse button 288 and a left-click wireless mouse button 288. It is appreciated that, in some embodiments, a click haptic solenoid energy harvester device 272 may be placed under other wireless mouse buttons 288, where present, of the wireless mouse 252 such as a back-button and forward mouse button used to allow a user to move between different webpages during execution of a web browser application on the information handling system. In these embodiments, each of the wire coils 280 of each of these plurality of click haptic solenoid energy harvester devices 272 is operatively coupled to the charging circuit board 286 having the ultracapacitor 262 such that each of the click haptic solenoid energy harvester devices 272 can charge the ultracapacitor 262 when the wireless mouse 252 is being actively used and is not in standby mode.

Figure 3:
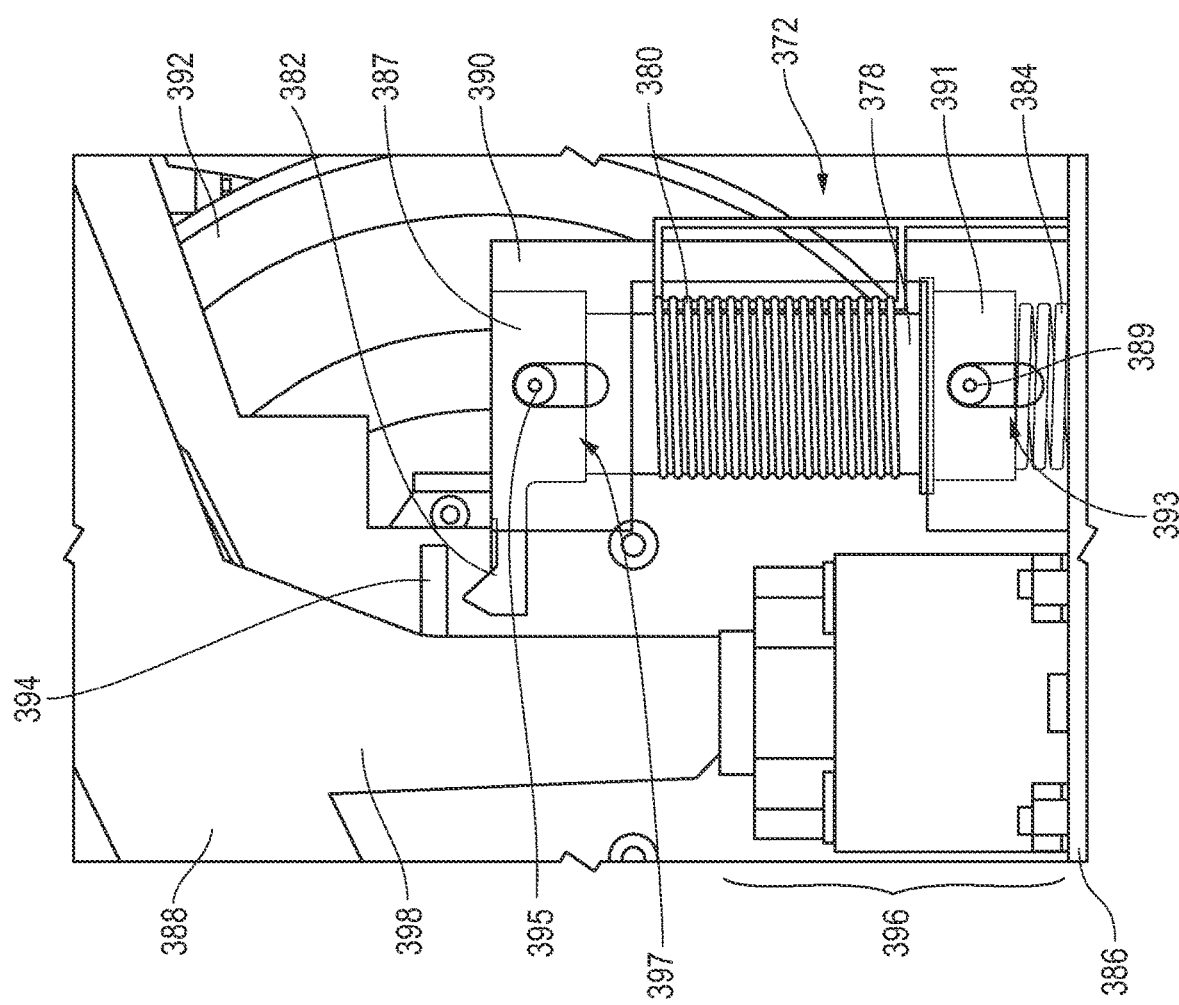
FIG. 3 is a side, enlarged view of a click haptic solenoid energy harvester device formed into the wireless mouse according to another embodiment of the present disclosure.

FIG. 3 is a side, enlarged view of a click haptic solenoid energy harvester device 372 formed into the wireless mouse according to another embodiment of the present disclosure. FIG. 3 shows a larger image of the click haptic solenoid energy harvester device 372 similar to the click haptic solenoid energy harvester device (e.g., 272) shown in FIG. 2. Again, it is appreciated that any number of click haptic solenoid energy harvester devices 372 may be placed and oriented under any number of wireless mouse buttons 388 on the wireless mouse such that each of the click haptic solenoid energy harvester devices 372 are used to charge an ultracapacitor (not shown) while the wireless mouse is in an active state and not in a standby state. The charging of this ultracapacitor allows for the wireless mouse to be powered by the ultracapacitor when, as described herein, the wireless mouse is in a sleep state. Consequently, when a mouse standby agent, being executed by a microcontroller (not shown) of the wireless mouse, detects that the wireless mouse has not been interacted with (e.g., wireless mouse buttons 388 not actuated or the user has not engaged with or moved the wireless mouse) after a threshold period of time has elapsed, the wireless mouse PMU may switch power from a wireless mouse battery to the ultracapacitor.

As described herein, the wireless mouse includes one or more input devices that, in the embodiment shown in FIG. 3, may include a wireless mouse button 388 and a wireless mouse scrolling wheel 392. The wireless mouse button 388 may be used by a user to provide selection input describing objects selected on a graphical user interface (GUI) presented to a user on a video display device. The wireless mouse scrolling wheel 392 may be used by a user, in an embodiment, to scroll across the GUI presented to a user on the video display device. This input may be transmitted to an information handling system wirelessly using a wireless mouse radio and wireless mouse antenna formed within the housing of the wireless mouse.

The wireless mouse button 388 may include a mouse button arm 398 that extends below the wireless mouse button 388 to, when actuated by a user, contact a switch unit 396. The physical actuation of the switch unit 396 by the force imparted on it by the mouse button arm 398 causes the input to be received at the wireless mouse MCU and provided, wirelessly, from the wireless mouse 352 to the information handling system via a wireless mouse radio and wireless mouse antenna as described herein.

As described herein, the mouse button arm 398 includes a mouse button plate 394. In an embodiment, the mouse button plate 394 extends out from the mouse button arm 398, generally, horizontally from the mouse button arm 398. As described herein, the mouse button plate 394 is used to interface, physically, with a striking arm 382 formed on the click haptic solenoid energy harvester device 372 in order to allow for the click haptic solenoid energy harvester device 372 to be activated thereby creating an electrical charge (e.g., at a voltage and current) to charge the ultracapacitor 262 while also providing haptic feedback to the wireless mouse button 388.

In an embodiment, the click haptic solenoid energy harvester device 372 may include a solenoid device that converts movement of the magnet 378 (e.g., permanent magnet) through the wire coil 380 into an electrical charge having a current and voltage. In an embodiment, the magnet 378 and wire coil 380 of the click haptic solenoid energy harvester device 372 is placed under a wireless mouse button 388 where actuation of the wireless mouse button 388 by a user, during use of the wireless mouse, forces the magnet 378 through the wire coil 380 via interfacing with the striking arm 382.

In an embodiment, a first end of the magnet 378, while passed into the wire coil 380, is operatively coupled to a striking arm 382 that interfaces with a mouse button plate 394 formed on the wireless mouse button 388. In an embodiment, a top cap 387 that includes the striking arm 382 may be placed above the magnet 378 and operatively coupled to the top surface of the magnet 378 using a fastener or adhesive such as a screw, a nail, glue and the like. The top cap 387 may be slidably secured into the click haptic solenoid energy harvester frame 390. In an embodiment, the top cap 387 includes a top cap finger 395 that passes through a first frame hole 397 formed in the click haptic solenoid energy harvester frame 390. The top cap finger 395, in an embodiment, prevents the top cap 387 from separating from the click haptic solenoid energy harvester frame 390 and twisting within the click haptic solenoid energy harvester frame 390. The first frame hole 397 provides for the top cap 387, magnet 378, and bottom cap 391 to move by a certain distance within the click haptic solenoid energy harvester frame 390 such that when the user presses down on the wireless mouse button 388, the magnet 378 is moved through the wire coil 380 by this distance. The first frame hole 397 also helps to guide the top cap 387 and magnet 378 through the wire coil 380 during this actuation of the wireless mouse button 388 by the user.

A second end of the magnet 378 may be operatively engaged with a spring 384 such that the magnet 378 is forced back through the wire coil 380 when pressure on the wireless mouse button 388 is released. In an embodiment, the second end of the magnet 378 may be operatively coupled to a bottom cap 391 that interfaces with the spring 384 used to force the magnet 378 upwards when pressure on the wireless mouse button 388 is released by the user. Similar to the top cap 387, the bottom cap 391 may include a bottom cap finger 389 that interfaces with the click haptic solenoid energy harvester frame 390 via a bottom cap finger 389 passing through a second frame hole 393. Again, the bottom cap finger 389 and the second frame hole 393 are used to hold the bottom cap 391, spring 384, and magnet 378 in place under the wireless mouse button 388 and its mouse button plate 394. The click haptic solenoid energy harvester frame 390 causes the magnet 378 to remain within the wire coil 380 but allows the magnet 378 to move through the wire coil 380 when the wireless mouse button 388 is actuated by a user.

The wire coil 380 is wrapped around a portion of the magnet 378 such that the wire coil 380 does not interfere with the movement of the magnet 378 as described herein. As the magnet 378 is moved through the wire coil 380, a current and voltage is created after every actuation of the wireless mouse button 388. This current and voltage is passed to, in an example embodiment, an ultracapacitor (not shown) formed on a charging circuit board 386. In an embodiment, the ends of the wire coil 380 may be electrically coupled to the ultracapacitor and charging circuit board 386 such that this current and voltage may be used to charge the ultracapacitor of the wireless mouse when the wireless mouse is being actively used and not in a standby mode. In an embodiment, the charging circuit board 386 may be or form part of a printed circuit board formed within the housing of the wireless mouse and used for other circuit components of the wireless mouse such as the wireless mouse MCU (not shown).

Additionally, as described herein, the wireless mouse MCU may execute computer readable program code of a mouse standby agent and mouse actuation/engagement agent. Execution of the mouse standby agent and mouse actuation/engagement agent allows the wireless mouse MCU to determine when to switch from powering the wireless mouse via the ultracapacitor to powering the wireless mouse with a wireless mouse battery. In an embodiment, the wireless mouse MCU may execute the mouse actuation/engagement agent to determine, with the actuation/engagement sensor, when a user's presence is at the wireless mouse, or the user interacts with the wireless mouse. Where execution of the mouse standby agent determines that user interaction, engagement, and/or presence is not detected within a threshold time period, the wireless mouse MCU may place the wireless mouse in a standby mode. As such, the wireless mouse MCU determines, via execution of the mouse standby agent, whether the wireless mouse is to be placed in a standby mode when no user presence is detected, when no actuation of the wireless mouse button 388 on the wireless mouse is detected, or when the wireless mouse has not been detected to have moved by the user within the threshold time period. When placed in a standby mode, the wireless mouse MCU may cause the wireless mouse to be powered by the ultracapacitor instead of the wireless mouse battery thereby conserving the power within the wireless mouse battery during non-use of the wireless mouse.

In an embodiment, the actuation/engagement sensor operatively coupled to the wireless mouse MCU may be any sensor that detects the user's presence at the wireless mouse or detect the user interacting with the wireless mouse. For example, the actuation/engagement sensor may include an LED optical movement tracking sensor, other movement tracking sensor, or accelerometer or other movement sensor to detect that a user has moved the wireless mouse. In another example, the actuation/engagement sensor may be a triggering device that detects a user actuating any wireless mouse button 388 or a specific mouse button on the wireless mouse. For example, the actuation/engagement sensor may include the switch unit 396 of the wireless mouse button 388 that, when providing input to the wireless mouse MCU, also indicates that the wireless mouse button 388 on the wireless mouse has been pressed or actuated by a user. In an embodiment, the actuation/engagement sensor may be a sensor that detects a user's interaction with the housing of the wireless mouse such as a motion detector or capacitive touch sensor that detects motion near or touch of the wireless mouse. In an embodiment, the actuation/engagement sensor may be a proximity sensor that emits an electromagnetic field or beam of electromagnetic radiation (e.g., infrared light) to detect changed in the field of the beam or a return signal bouncing off of an object such as the user.

Figure 4B:
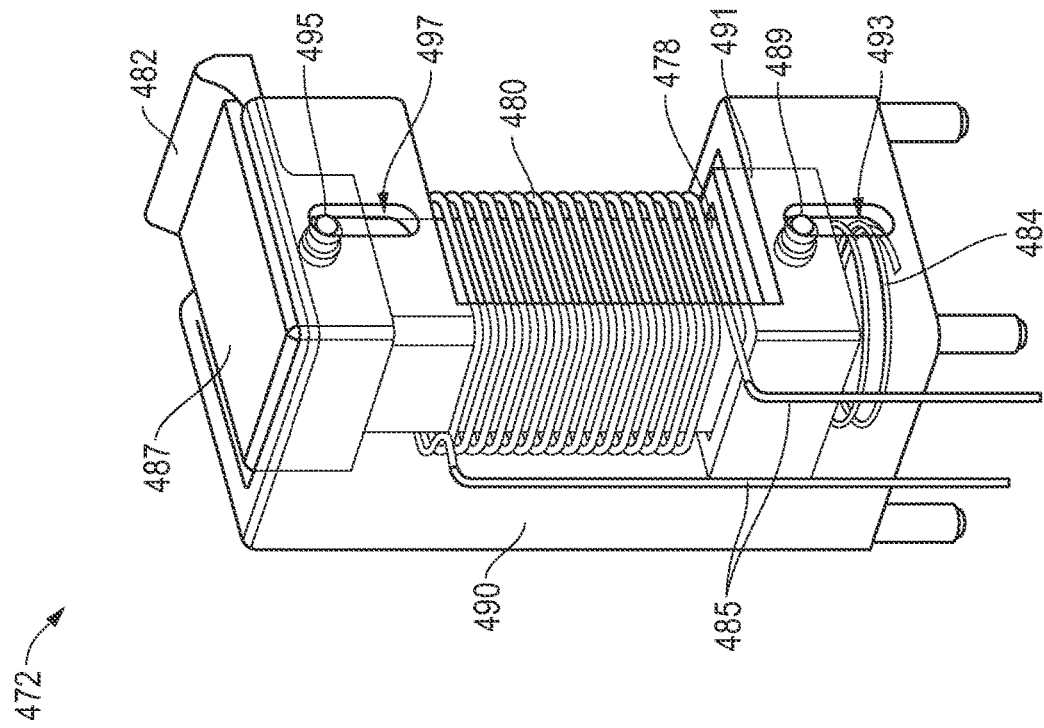
FIG. 4B is a perspective view of a click haptic solenoid energy harvester device according to another embodiment of the present disclosure.
Figure 4A:
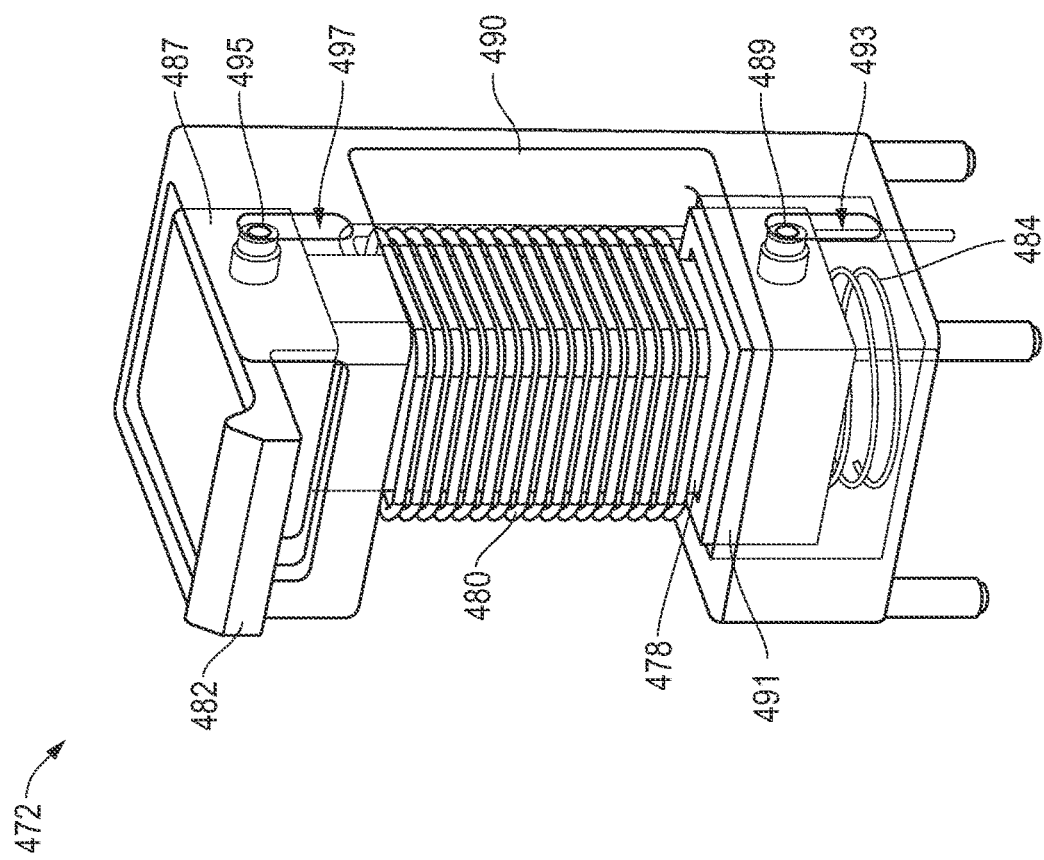
FIG. 4A is a perspective view of a click haptic solenoid energy harvester device according to another embodiment of the present disclosure.

FIG. 4A is a perspective view of a click haptic solenoid energy harvester device 472 according to another embodiment of the present disclosure. Additionally, FIG. 4B is a perspective view of a click haptic solenoid energy harvester device 472 according to another embodiment of the present disclosure. FIGS. 4A and 4B show additional views of the click haptic solenoid energy harvester device 472 than that shown in FIG. 3, for example, in order to show additional features of the click haptic solenoid energy harvester device 472.

FIG. 4A, for example, shows the click haptic solenoid energy harvester device 472 similar to the click haptic solenoid energy harvester devices shown in FIGS. 2 and 3 herein. Again, it is appreciated that any number of click haptic solenoid energy harvester devices 472 may be placed and oriented under any number of wireless mouse buttons (not shown in FIGS. 4A and 4B) on the wireless mouse such that each of the click haptic solenoid energy harvester devices 472 are used to charge an ultracapacitor (not shown) while the wireless mouse is in an active state and not in a standby or sleep state. The charging of this ultracapacitor allows for the wireless mouse to be powered by the ultracapacitor when, as described herein, the wireless mouse is in a standby or sleep state. Consequently, when a mouse standby agent, being executed by a microcontroller (not shown) of the wireless mouse, detects that the wireless mouse has not been interacted with (e.g., wireless mouse buttons not actuated or the user has not engaged with the wireless mouse) after a threshold period of time has elapsed, the wireless mouse PMU may switch power from a wireless mouse battery to the ultracapacitor.

As described herein, the click haptic solenoid energy harvester device 472 includes a striking arm 482 formed on the click haptic solenoid energy harvester device 472 in order to allow for the click haptic solenoid energy harvester device 472 to be activated thereby creating an electrical charge (e.g., at a voltage and current) to charge the ultracapacitor. The striking arm 482 may form a part of the top cap 487 thereby forming a monolithic piece. Alternatively, the striking arm 482 may be coupled to the top cap 487 using, for example, a fastener (e.g., a screw, bolt, etc.) or an adhesive (e.g., glue). The striking arm 482 may be used to provide haptic feedback to the wireless mouse button.

In an embodiment, the click haptic solenoid energy harvester device 472 may include a solenoid device that converts movement of the magnet 478 (e.g., permanent magnet) through the wire coil 480 into an electrical charge having a current and voltage. In an embodiment, the magnet 478 and wire coil 480 of the click haptic solenoid energy harvester device 472 is placed under a wireless mouse button where actuation of the wireless mouse button by a user, during use of the wireless mouse, forces the magnet 478 through the wire coil 480. In an embodiment, the magnet 478 may have a shape of a rectangular cuboid, cylinder, or other shape with the length of the magnet 478 passing through the wire coil 480. In an embodiment, the wire coil 480 may be wrapped around a perimeter of the magnet 478 such that the wire coil 480 is wrapped around the magnet 478 but not touching the magnet 478. It is appreciated, however, that the shape of the magnet 478 may be any shape that allows a portion of the magnet 478 to be passed through the wire coil 480 as described herein.

In an embodiment, a first end of the magnet 478, while passed into the wire coil 480, is operatively coupled to the striking arm 482 and top cap 487 with the striking arm 482 oriented to interface with a mouse button plate formed on the wireless mouse button as described in FIG. 3, for example. In an embodiment, a top cap 489 that includes the striking arm 482 may be placed above the magnet 478 and operatively coupled to the top surface of the magnet 478 using a fastener or adhesive such as a screw, a nail, glue and the like. As the mouse button plate strikes the striking arm 482 causing a click or haptic feedback, the spring 484 provides a push back on the wireless mouse button.

The top cap 487 may be slidably secured into the click haptic solenoid energy harvester frame 490. In an embodiment, the top cap 487 includes a top cap finger 495 that passes through a first frame hole 497 formed in the click haptic solenoid energy harvester frame 490. The top cap finger 495, in an embodiment, prevents the top cap 487 from separating from the click haptic solenoid energy harvester frame 490. The first frame hole 497 causes the top cap 487, magnet 478, and bottom cap 491 to move by a certain distance within the click haptic solenoid energy harvester frame 490 such that when the user presses down on the wireless mouse button, the magnet 478 is moved through the wire coil 480 by this distance. The first frame hole 497 also helps to guide the top cap 487 and magnet 478 through the wire coil 480 during this actuation of the wireless mouse button by the user. It is appreciated and shown in FIGS. 4A and 4B that the click haptic solenoid energy harvester frame 490 includes two first frame holes 497 formed on opposites sides of the click haptic solenoid energy harvester frame 490 and top cap 487 such that a top cap finger 495 may be passed into these two holes. Again, this allows the top cap 487 and other elements of the click haptic solenoid energy harvester device 472 to be held within the click haptic solenoid energy harvester frame 490 during operation.

A second end of the magnet 478 may be operatively engaged with a spring 484 such that the magnet 478 is forced back through the wire coil 480 when pressure on the wireless mouse button is released. In an embodiment, the second end of the magnet 478 may be operatively coupled to a bottom cap 491 that interfaces with the spring 484 used to force the magnet 478 upwards when pressure on the wireless mouse button is released by the user. Similar to the top cap 487, the bottom cap 491 may include a bottom cap finger 489 that interfaces with the click haptic solenoid energy harvester frame 490 via a bottom cap finger 489 passing through a second frame hole 493. Again, the bottom cap finger 489 and the second frame hole 493 are used to hold the bottom cap 491, spring 484, and magnet 478 in place under the wireless mouse button and its mouse button plate 494. The click haptic solenoid energy harvester frame 490 causes the magnet 478 to remain within the wire coil 480 but allows the magnet 478 to move through the wire coil 480 when the wireless mouse button is actuated by a user. It is appreciated and shown in FIGS. 4A and 4B that the click haptic solenoid energy harvester frame 490 includes two second frame holes 493 formed on opposites sides of the click haptic solenoid energy harvester frame 490 and bottom cap 491 such that a bottom cap finger 489 may be passed into these two holes. Again, this allows the bottom cap 491 and other elements of the click haptic solenoid energy harvester device 472 to be held within the click haptic solenoid energy harvester frame 490 during operation.

The wire coil 480 is wrapped around a portion of the magnet 478 such that the wire coil 480 does not interfere with the movement of the magnet 478 as described herein. As the magnet 478 is moved through the wire coil 480, a current and voltage is created after every actuation of the wireless mouse button as described herein. This current and voltage is passed to, in an example embodiment, an ultracapacitor (not shown) formed on a charging circuit board (not shown) via wire leads 485 of the wire coil 480. In an embodiment, the wire leads 485 of the wire coil 480 may be electrically coupled to the ultracapacitor and charging circuit board such that this current and voltage may be used to charge the ultracapacitor of the wireless mouse when the wireless mouse is not in a standby mode. In an embodiment, the charging circuit board may be, or form part of a printed circuit board formed within the housing of the wireless mouse and used for other circuit components of the wireless mouse such as the wireless mouse MCU (not shown).

Additionally, as described herein, the wireless mouse MCU may execute computer readable program code of a mouse standby agent and mouse actuation/engagement agent. Execution of the mouse standby agent and mouse actuation/engagement agent allows the wireless mouse MCU to determine when to switch from powering the wireless mouse via the ultracapacitor to powering the wireless mouse with a wireless mouse battery. In an embodiment, the wireless mouse MCU may execute the mouse actuation/ engagement agent to determine, with the actuation/engagement sensor (not shown), when a user's presence is at the wireless mouse, or the user interacts with the wireless mouse. Where execution of the mouse standby agent determines that user interaction, engagement, and/or presence is not detected within a threshold time period, the wireless mouse MCU may place the wireless mouse in a standby mode. As such, the wireless mouse MCU determines, via execution of the mouse standby agent, whether the wireless mouse is to be placed in a standby mode when no user presence is detected, when no actuation of the wireless mouse button on the wireless mouse is detected, or when the wireless mouse has not been detected to have moved by the user within the threshold time period. When placed in a standby mode, the wireless mouse MCU may cause the wireless mouse to be powered by the ultracapacitor instead of the wireless mouse battery thereby conserving the power within the wireless mouse battery during non-use of the wireless mouse.

In an embodiment, the actuation/engagement sensor operatively coupled to the wireless mouse MCU may be any sensor that detects the user's presence at the wireless mouse or detect the user interacting with the wireless mouse. For example, the actuation/engagement sensor may include an LED optical movement tracking sensor, other movement tracking sensor, accelerometer, or other movement sensor to detect that a user has moved the wireless mouse. In another example, the actuation/engagement sensor may be a triggering device that detects a user actuating any wireless mouse button or a specific mouse button on the wireless mouse. For example, the actuation/engagement sensor may include the switch unit (not shown) of the wireless mouse button 388 that, when providing input to the wireless mouse MCU, also indicates that the wireless mouse button on the wireless mouse has been pressed or actuated by a user. In an embodiment, the actuation/engagement sensor may be a sensor that detects a user's interaction with the housing of the wireless mouse such as a motion detector or capacitive touch sensor that detects motion near the wireless mouse. In an embodiment, the actuation/engagement sensor may be a proximity sensor that emits an electromagnetic field or beam of electromagnetic radiation (e.g., infrared light) to detect changed in the field of the beam or a return signal bouncing off of an object such as the user.

FIG. 5A is a side view of a click haptic solenoid energy harvester device 572 formed within a housing of a wireless mouse and operating relative to a mouse button plate 594 formed on a mouse button arm 598 of a wireless mouse button in an unpressed position according to an embodiment of the present disclosure. Similarly, FIG. 5B is a side view of the click haptic solenoid energy harvester device 572 formed within the housing of the wireless mouse and operatively relative to a mouse button plate 594 of the mouse button arm 598 formed on a wireless mouse button in a pressed position according to another embodiment of the present disclosure. FIG. 5A shows the click haptic solenoid energy harvester device 572, switch unit 596, and wireless mouse button in an unactuated state while FIG. 5B shows the click haptic solenoid energy harvester device 572, the switch unit 596, and the wireless mouse button in an unpressed position of the wireless mouse in the actuated state.

Both of FIGS. 5A and 5B show the mouse button arm 598 of the wireless mouse button that extends below the wireless mouse button to, when actuated by a user, contact a switch unit 596. FIG. 5A shows the switch unit 596 in an unactuated state where the mouse button arm 598 has not come into contact with the switch unit 596. The mouse button plate 594 has also not contacted the ridge or raised edge of the striking arm 582 with a gap shown between the same. The physical actuation of the switch unit 596 by the force imparted on it by the mouse button arm 598 causes the input as shown in FIG. 5B to be received at the wireless mouse MCU (not shown) and provided, wirelessly, from the wireless mouse to the information handling system via a wireless mouse radio and wireless mouse antenna as described herein.

As described herein, the mouse button arm 598 includes a mouse button plate 594. In an embodiment, the mouse button plate 594 extends out from the mouse button arm 598, generally, horizontally from the mouse button arm 598. As described herein, the mouse button plate 594 is used to interface, physically, with a striking arm 582 formed on the click haptic solenoid energy harvester device 572 in order to allow for the click haptic solenoid energy harvester device 572 to be activated thereby creating an electrical charge (e.g., at a voltage and current) to charge the ultracapacitor (not shown). Again, FIG. 5A shows the mouse button plate 594 not in physical contact with the striking arm 582 due to the wireless mouse button not being actuated by the user. FIG. 5B, however, does show the physical contact and movement of the striking arm 582 by the mouse button plate 594 due to a user actuating the wireless mouse button and forcing the mouse button arm 598 down. The mouse button plate 594 strikes the striking arm 582 to generate a haptic click sound and feel. The raised ridge or raised edge of the striking arm 582 enhances the haptic click when contacted by the mouse button plate 594 by contact along the top point of the raised ridge or edge.

In an embodiment, the click haptic solenoid energy harvester device 572 includes a solenoid device that converts movement of the magnet 578 (e.g., permanent magnet) through the wire coil 580 into an electrical charge having a current and voltage. In an embodiment, the magnet 578 and wire coil 580 of the click haptic solenoid energy harvester device 572 is placed under a wireless mouse button where actuation of the wireless mouse button by a user, during use of the wireless mouse, forces the magnet 578 through the wire coil 580.

As described herein, a first end of the magnet 578, while passed into the wire coil 580, is operatively coupled to a top cap 587 that includes the striking arm 582 placed above the magnet 578 and operatively coupled to the top surface of the magnet 578 using a fastener or adhesive such as a screw, a nail, glue, or the like. The top cap 587 may be slidably secured into the click haptic solenoid energy harvester frame 590. Again, the top cap 587 includes a top cap finger 595 that passes through a first frame hole 597 formed in the click haptic solenoid energy harvester frame 590. The top cap finger 595, in an embodiment, prevents the top cap 587 from separating from the click haptic solenoid energy harvester frame 590. The first frame hole 597 causes the top cap 587, magnet 578, and bottom cap 591 to move by a certain distance within the click haptic solenoid energy harvester frame 590 such that when the user presses down on the wireless mouse button, the magnet 578 is moved through the wire coil 580 by this distance. The first frame hole 597 also helps to guide the top cap 587 and magnet 578 through the wire coil 580 during this actuation of the wireless mouse button by the user.

A second end of the magnet 578 may be operatively engaged with a spring 584 such that the magnet 578 is forced back through the wire coil 580 when pressure on the wireless mouse button is released. The spring 584 imparts an upward rebound force on the striking arm 582 and the mouse button plate 594 to add an additional haptic aspect of a rebound feel to the wireless mouse button. In an embodiment, the second end of the magnet 578 may be operatively coupled to a bottom cap 591 that interfaces with the spring 584 used to force the magnet 578 upwards when pressure on the wireless mouse button is released by the user. Similar to the top cap 587, the bottom cap 591 may include a bottom cap finger 589 that interfaces with the click haptic solenoid energy harvester frame 590 via a bottom cap finger 589 passing through a second frame hole 593. Again, the bottom cap finger 589 and the second frame hole 593 are used to hold the bottom cap 591, spring 584, and magnet 578 in place under the wireless mouse button and its mouse button plate 594. The click haptic solenoid energy harvester frame 590 causes the magnet 578 to remain within the wire coil 580 but allows the magnet 578 to move through the wire coil 580 when the wireless mouse button is actuated by a user.

The wire coil 580 is wrapped around a portion of the magnet 578 such that the wire coil 580 does not interfere with the movement of the magnet 578 as described herein. As the magnet 578 is moved through the wire coil 580, a current and voltage is created after every actuation of the wireless mouse button. This current and voltage is passed to, in an example embodiment, an ultracapacitor (not shown) formed on a charging circuit board 586. In an embodiment, the wire leads 585 of the wire coil 580 may be electrically coupled to the ultracapacitor and charging circuit board 586 such that this current and voltage may be used to charge the ultracapacitor of the wireless mouse when the wireless mouse is not in a standby mode. In an embodiment, the charging circuit board 586 may be or form part of a printed circuit board formed within the housing of the wireless mouse and used for other circuit components of the wireless mouse such as the wireless mouse MCU (not shown).

Without actuation, the orientation of the mouse button arm 598 and mouse button plate 594 relative to the switch unit 596 and striking arm 582 is shown in FIG. 5A. As a user actuates the wireless mouse button, the mouse button arm 598 is forced downward. This causes the mouse button arm 598 to contact the switch unit 596 to provide input, via the wireless mouse, to an information handling system using a wireless mouse MCU and wireless mouse radio/antenna. Concurrently, as the mouse button arm 598 moves down, the mouse button plate 594 comes in physical contact with the striking arm 582 of the click haptic solenoid energy harvester device 572 causing a haptic click upon colliding with the raised ridge or edge on the striking arm 582. Because the striking arm 582 is operatively coupled to the top cap 587, some of the elements within the click haptic solenoid energy harvester frame 590 are also forced down. These elements include the striking arm 582, the top cap 587, the magnet 578, the bottom cap 591, and the spring 584 are forced down. Although the spring 584 provides a force against the bottom surface of the bottom cap 591, the force applied to the wireless mouse button overcomes this resistive force of the spring 584. By forcing these elements down through the click haptic solenoid energy harvester frame 590, the magnet 578 is passed a distance through the wire coil 580 thereby creating the voltage and current used to charge the ultracapacitor as described herein. The rebound force of the spring 584 forces the magnet 578 back up through the wire coil 580 to generate additional charge in some embodiments as well as provide a rebound haptic feel at the wireless mouse button.

Figure 6:
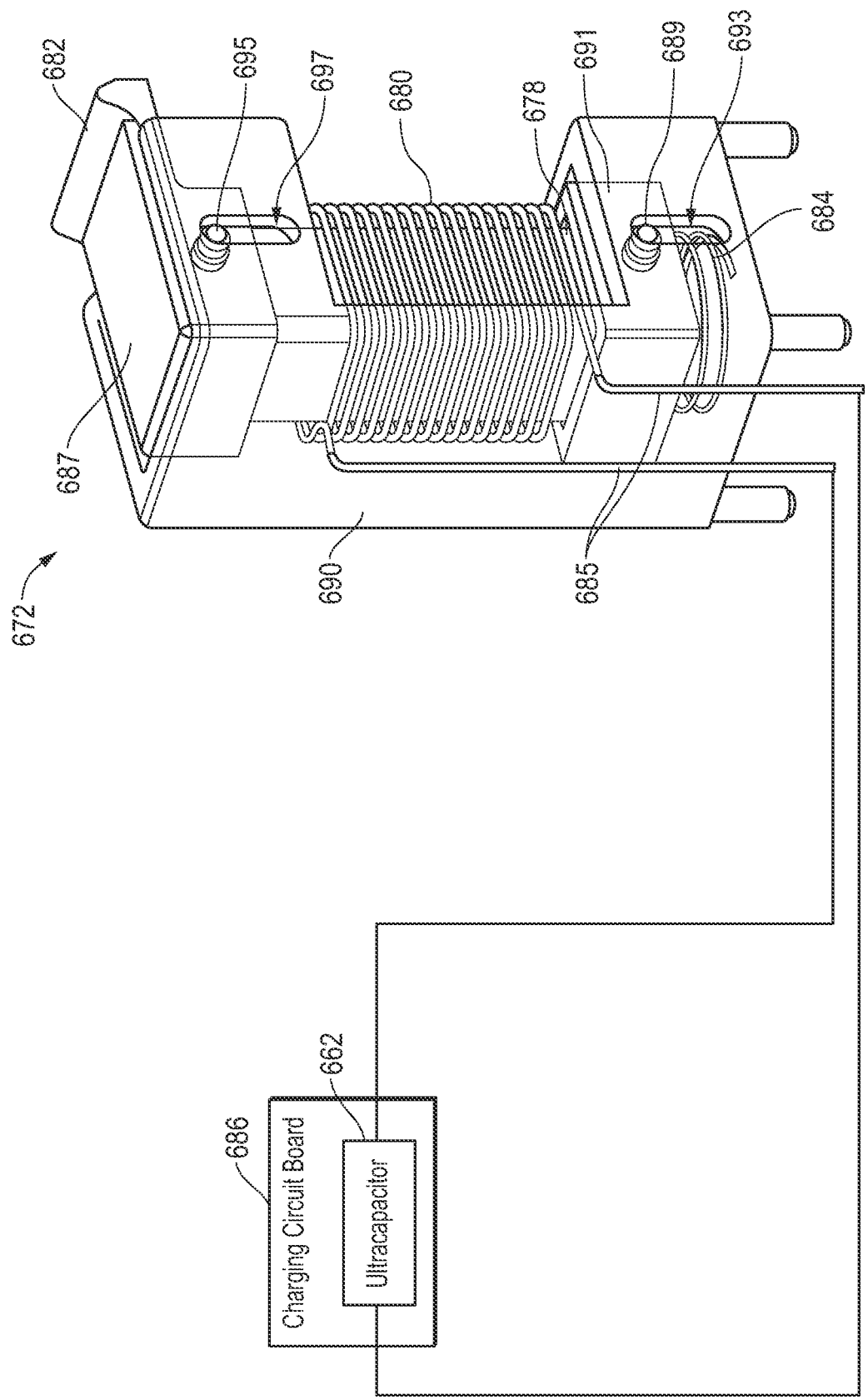
FIG. 6 is a block diagram and perspective view of a click haptic solenoid energy harvester device operatively coupled to an ultracapacitor and charging circuit board of a wireless mouse according to an embodiment, of the present disclosure.

FIG. 6 is a block diagram and perspective view of a click haptic solenoid energy harvester device 672 operatively coupled to a ultracapacitor 662 and charging circuit board 686 of a wireless mouse via charging circuitry according to an embodiment, of the present disclosure. FIG. 6 shows the click haptic solenoid energy harvester device 672 similar to the click haptic solenoid energy harvester devices shown in FIGS. 2, 3, 4A, 4B, 5A, and 5B herein. Again, it is appreciated that any number of click haptic solenoid energy harvester devices 472 may be placed and oriented under any number of wireless mouse buttons (not shown in FIG. 6) on the wireless mouse such that each of the click haptic solenoid energy harvester devices 672 are used to charge an ultracapacitor 662 formed on the charging circuit board 686 while the wireless mouse is not in a standby or sleep state. The charging of this ultracapacitor 662 allows for the wireless mouse to be powered by the ultracapacitor 662 when, as described herein, the wireless mouse is in a sleep state. Consequently, when a mouse standby agent, being executed by a microcontroller (not shown) of the wireless mouse and operatively coupled to the charging circuit board 686 and ultracapacitor 662, detects that the wireless mouse has not been interacted with (e.g., wireless mouse buttons not actuated or the user has not engaged with the wireless mouse) after a threshold period of time has elapsed, the wireless mouse PMU may switch power from a wireless mouse battery to the ultracapacitor 662.

As described herein, the click haptic solenoid energy harvester device 672 includes a striking arm 682 formed on the click haptic solenoid energy harvester device 672 in order to allow for the click haptic solenoid energy harvester device 672 to be activated thereby creating an electrical charge (e.g., at a voltage and current) to charge the ultracapacitor 662. In an embodiment, the click haptic solenoid energy harvester device 672 may include a solenoid device that converts movement of the magnet 678 (e.g., permanent magnet) through the wire coil 680 into an electrical charge having a current and voltage. Charging circuitry may include an inverter and diodes or other circuitry (not shown) to provide for charging of the ultracapacitor when the magnet 678 is moved either up or down within the wire coil 680 in some embodiments.

In an embodiment, a first end of the magnet 678, while passed into the wire coil 680, is operatively coupled to the striking arm 682 and top cap 687 with the striking arm 682 oriented to interface with a mouse button plate formed on the wireless mouse button. The top cap 687 may be slidably secured into the click haptic solenoid energy harvester frame 690. In an embodiment, the top cap 687 includes a top cap finger 695 that passes through a first frame hole 697 formed in the click haptic solenoid energy harvester frame 690. The first frame hole 697 causes the top cap 687, magnet 678, and bottom cap 691 to move by a certain distance within the click haptic solenoid energy harvester frame 690 such that when the user presses down on the wireless mouse button, the magnet 678 is moved through the wire coil 680 by this distance. The first frame hole 697 also helps to guide the top cap 687 and magnet 678 through the wire coil 680 during this actuation of the wireless mouse button by the user.

A second end of the magnet 678 may be operatively engaged with a spring 684 such that the magnet 678 is forced back through the wire coil 680 when pressure on the wireless mouse button is released. In an embodiment, the second end of the magnet 678 may be operatively coupled to a bottom cap 691 that interfaces with the spring 684. Similar to the top cap 687, the bottom cap 691 may include a bottom cap finger 689 that interfaces with the click haptic solenoid energy harvester frame 690 via a bottom cap finger 689 passing through a second frame hole 693. Again, the bottom cap finger 689 and the second frame hole 693 are used to hold the bottom cap 691, spring 684, and magnet 678 in place under the wireless mouse button and its mouse button plate 694.

As a user actuates the wireless mouse button, the mouse button arm is forced downward. As the mouse button arm moves down, the mouse button plate comes in physical contact with the striking arm 682 of the click haptic solenoid energy harvester device 672 and, in particular, with the raised ridge or edge to generate a haptic click. Because the striking arm is operatively coupled to the top cap 687, some of the elements within the click haptic solenoid energy harvester frame 690 are also forced down. These elements include the striking arm 682, the top cap 687, the magnet 678, the bottom cap 691, and the spring 684 being forced down. Although the spring 684 provides a force against the bottom surface of the bottom cap 691, the force applied to the wireless mouse button overcomes this resistive force of the spring 684. By forcing these elements down through the click haptic solenoid energy harvester frame 690, the magnet 678 is passed a distance through the wire coil 680 thereby creating the voltage and current used to charge the ultracapacitor 662 as described herein. Spring 584 causes a rebound of the magnet 678 back through the wire coil 680 generating additional charge in some embodiments and providing rebound haptics at the wireless mouse button.

Additionally, as described herein, the wireless mouse MCU may execute computer readable program code of a mouse standby agent and mouse actuation/engagement agent. Execution of the mouse standby agent and mouse actuation/engagement agent allows the wireless mouse MCU to determine when to switch from powering the wireless mouse via the ultracapacitor 662 to powering the wireless mouse with a wireless mouse battery. In an embodiment, the wireless mouse MCU may execute the mouse actuation/engagement agent to determine, with the actuation/engagement sensor (not shown), when a user's presence is at the wireless mouse, or the user interacts with the wireless mouse. Where execution of the mouse standby agent determines that user interaction, engagement, and/or presence is not detected within a threshold time period, the wireless mouse MCU may place the wireless mouse in a standby mode. As such, the wireless mouse MCU determines, via execution of the mouse standby agent, whether the wireless mouse is to be placed in a standby mode when no user presence is detected, when no actuation of the wireless mouse button on the wireless mouse is detected, or when the wireless mouse has not been detected to have moved by the user within the threshold time period. When placed in a standby mode, the wireless mouse MCU may cause the wireless mouse to be powered by the ultracapacitor 662 instead of the wireless mouse battery thereby conserving the power within the wireless mouse battery during non-use of the wireless mouse.

In an embodiment, the actuation/engagement sensor (not shown) operatively coupled to the wireless mouse MCU may be any sensor that detects the user's presence at the wireless mouse or detect the user interacting with the wireless mouse. For example, the actuation/engagement sensor may include an LED optical movement tracking sensor, accelerometer, or other movement tracking sensor or movement sensor to detect that a user has moved the wireless mouse. In another example, the actuation/engagement sensor may be a triggering device that detects a user actuating any wireless mouse button or a specific mouse button on the wireless mouse. For example, the actuation/engagement sensor may include the switch unit (not shown) of the wireless mouse button 388 that, when providing input to the wireless mouse MCU, also indicates that the wireless mouse button on the wireless mouse has been pressed or actuated by a user. In an embodiment, the actuation/engagement sensor may be a sensor that detects a user's interaction with the housing of the wireless mouse such as a motion detector that detects motion or a capacitive touch detector that detects a user's touch near or on the wireless mouse. In an embodiment, the actuation/engagement sensor may be a proximity sensor that emits an electromagnetic field or beam of electromagnetic radiation (e.g., infrared light) to detect changed in the field of the beam or a return signal bouncing off of an object such as the user.

Figure 7:
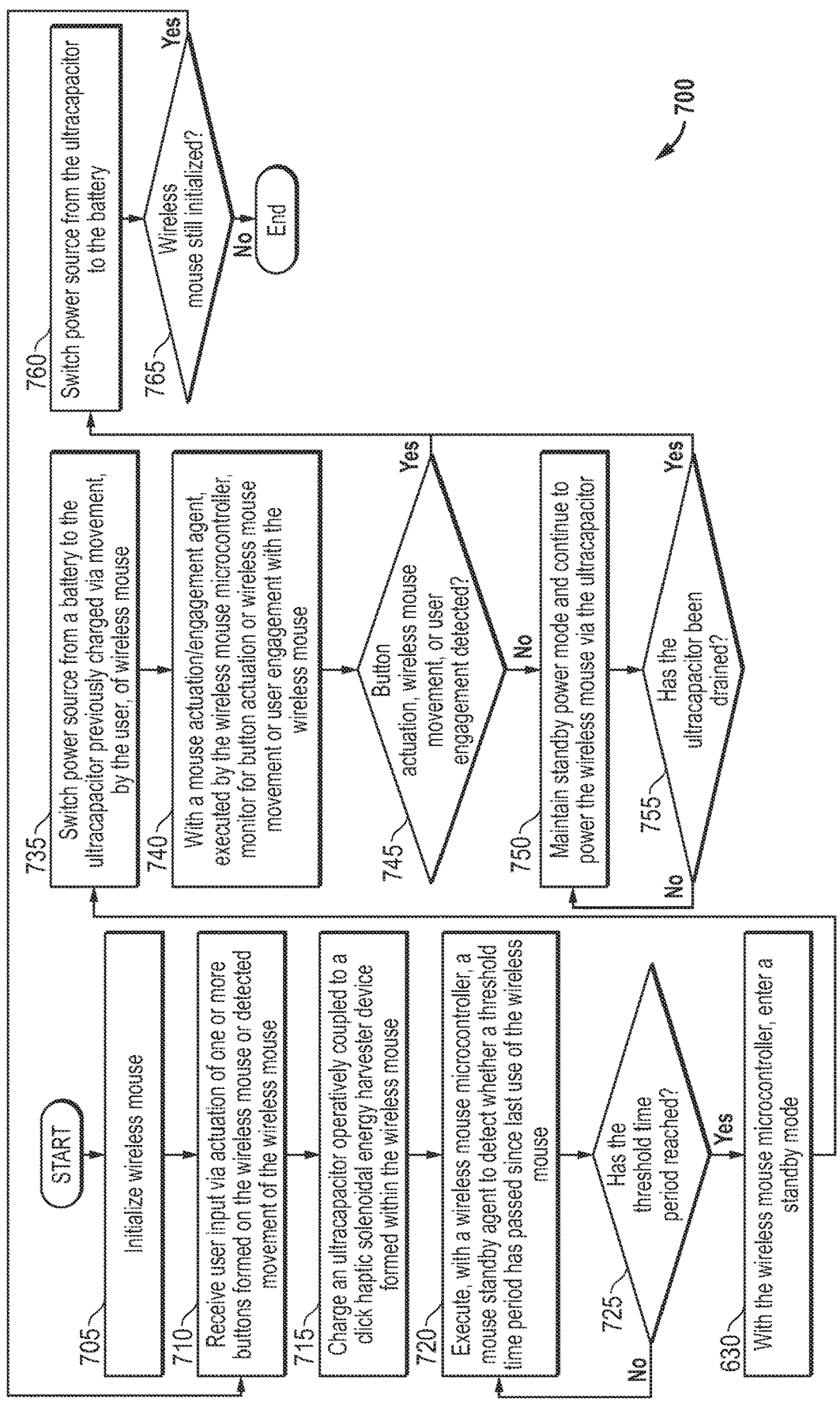
FIG. 7 is a flow diagram illustrating a method of operating a wireless mouse with a click haptic energy harvester device and an ultracapacitor that is operatively coupled to an information handling system according to an embodiment of the present disclosure.

FIG. 7 is a flow diagram illustrating a method 700 of operating a wireless mouse with a click haptic solenoid energy harvester that is operatively coupled to an information handling system according to an embodiment of the present disclosure. As described herein, the wireless mouse includes at least one click haptic solenoid energy harvester device formed under a wireless mouse button and within a housing of the wireless mouse. As described herein, the wireless mouse may include a plurality of click haptic solenoid energy harvester devices each being placed under a wireless mouse button. It is appreciated, therefore, that the ultracapacitor described herein may be charged by a plurality of click haptic solenoid energy harvester devices placed under a plurality of mouse buttons.

The method 700 may include, at block 705, initializing the wireless mouse. As described herein, the initialization of the wireless mouse may include a user actuating a power button or switch to cause power to be provided to, at least, the wireless mouse microcontroller.

At block 710, the method 700 further includes receiving user input at the wireless mouse via actuation of one or more mouse buttons formed on the wireless mouse, rotation of the wireless mouse scroll wheel, and/or movement of the wireless mouse. The wireless mouse may allow a user to provide input to an information handling system. Because the wireless mouse is wirelessly coupled to the information handling system, the wireless mouse includes a wireless mouse radio and wireless mouse antenna to transceive this input data to the information handling system.

The method 700 includes, at block 715, charging the ultracapacitor operatively coupled to the click haptic solenoid energy harvester device formed under one or more wireless mouse buttons and in the housing of the wireless mouse. As described herein, the click haptic solenoid energy harvester device includes a magnet that is passed through the wire coil. In an embodiment, a first end of the magnet, while passed into the wire coil, is operatively coupled to a striking arm that interfaces with a mouse button plate formed on the wireless mouse button. As the wireless mouse button is pressed, the mouse button plate descends and strikes a raised edge of the striking arm to cause a haptic click and urging the striking arm down. In an embodiment, a top cap that includes the striking arm may be placed above the magnet and operatively coupled to the top surface of the magnet using a fastener or adhesive such as a screw, a nail, glue and the like. The top cap may be slidably secured into the click haptic solenoid energy harvester frame. In an embodiment, the top cap includes a top cap finger that passes through a first frame hole formed in the click haptic solenoid energy harvester frame. The top cap finger, in one embodiment, prevents the top cap from separating from the click haptic solenoid energy harvester frame. The first frame hole causes the top cap, magnet, and bottom cap to move by a certain distance within the click haptic solenoid energy harvester frame such that when the user presses down on the wireless mouse button, the magnet is moved through the wire coil by this distance. The first frame hole also helps to guide the top cap and magnet through the wire coil during this actuation of the wireless mouse button by the user.

A second end of the magnet may be operatively engaged with a spring such that the magnet is forced back through the wire coil when pressure on the wireless mouse button is released by a rebound force exerted by the spring. In an embodiment, the second end of the magnet may be operatively coupled to a bottom cap that interfaces with the spring used to force the magnet upwards when pressure on the wireless mouse button is released by the user. Similar to the top cap, the bottom cap may include a bottom cap finger that interfaces with the click haptic solenoid energy harvester frame via a bottom cap finger passing through a second frame hole. Again, the bottom cap finger and the second frame hole are used to hold the bottom cap, spring, and magnet in place under the wireless mouse button and its mouse button plate. The click haptic solenoid energy harvester frame causes the magnet to remain within the wire coil but allows the magnet to move through the wire coil when the wireless mouse button is actuated by a user.

The wire coil is wrapped around a portion of the magnet such that the wire coil does not interfere with the movement of the magnet as described herein. As the magnet is moved through the wire coil, a current and voltage is created after every actuation of the wireless mouse button. Charging may occur during both down and up magnet movement in some embodiments. This current and voltage is passed to, in an example embodiment, an ultracapacitor formed on a charging circuit board. In an embodiment, the ends of the wire coil may be electrically coupled to the ultracapacitor and charging circuit board such that this current and voltage may be used to charge the ultracapacitor of the wireless mouse when the wireless mouse is not in a standby mode. In an embodiment, the charging circuit board may be, or form part of a printed circuit board formed within the housing of the wireless mouse and used for other circuit components of the wireless mouse such as the wireless mouse MCU.

At block 720, the method 700 includes executing, with a wireless mouse microcontroller, a mouse standby agent to detect whether a threshold time period has passed since the wireless mouse was last used and/or the user had been detected at the wireless mouse. As described herein, the execution of the mouse standby agent may include the initiation of a countdown clock that determines whether this threshold time period has passed. Concurrently, the wireless mouse microcontroller executes a mouse actuation/engagement agent such that the wireless mouse microcontroller is notified if and when a user has actuated a key or wireless mouse button on the wireless mouse or has detected, via an actuation/engagement sensor, the user at the wireless mouse or movement of the wireless mouse. Where the execution of the mouse actuation/engagement agent by the wireless mouse microcontroller indicates actuation of, movement of the wireless mouse, pressing of a mouse button, or presence of the user, this countdown clock is reset, and the mouse standby agent waits for the countdown to be met.

At block 725, therefore, the wireless mouse microcontroller determines whether the threshold time period has been reached by the countdown expiring. Where the time period has not been exceeded due to the execution of the mouse actuation/engagement agent indicating user actuation of a mouse button, rotation of the wireless mouse scroll wheel, movement of the wireless mouse, and/or presence of a user, the method 700 returns to block 720 described herein. However, where the user has walked away from the wireless mouse thereby allowing the threshold time limit to expire at block 725, the method 700 continues to block 730.

At block 730, the wireless mouse microcontroller causes the wireless mouse to enter into a standby mode that reduces the power consumption of the wireless mouse. However, the wireless mouse radio and even the microcontroller may continue to operate to scan or monitor for wireless communications from the information handling system or to be ready to detect an actuation of the wireless mouse button, movement of the wireless mouse, rotation of the wireless mouse scroll wheel, and/or user presence. Thus, power is still consumed, but at a lower level. In prior art systems, this may drain the dry cell batteries.

At block 735, the wireless mouse microcontroller may switch power sources from the wireless mouse battery to the ultracapacitor. Because the ultracapacitor was previously charged via movement of the wireless mouse and operation of the click haptic solenoid energy harvester device, the ultracapacitor has sufficient power to power the wireless mouse for a time while in standby mode. However, depending on the length of time that the wireless mouse is in standby mode, the ultracapacitor may not be capable of powering the wireless mouse and eventually, the wireless mouse microcontroller may switch back to operating the wireless mouse off of the power from the wireless mouse battery when power has been drained in the ultracapacitor as described herein. Nonetheless, this will prolong the life of the wireless mouse battery, especially dry cell batteries.

At block 740, the wireless mouse microcontroller, via execution of the mouse actuation/engagement agent, may monitor for user actuation of a mouse key and/or user engagement with the wireless mouse. As described herein, the execution of the mouse actuation/engagement agent looks for one or more of a plurality of triggering events that will bring the wireless mouse out of the standby mode. A first triggering event includes the movement of a mouse as detected by an optical tracking movement sensor, trackball system, or other movement tracker or motion detector such as an accelerometer (e.g., user bumps or moves the wireless mouse). A second triggering event includes an actuation of any mouse button (e.g., switch unit 596 in FIG. 5) which may be a button switch that is mechanical, capacitive, electrical, resistive, magnetic, or other known in the art. In an embodiment, when input from any mouse button is received at the wireless mouse microcontroller, the wireless mouse microcontroller wakes up and executes the actuation/engagement sensor as described herein. A third triggering event could include, in some embodiments, an actuation of a wireless mouse scroll wheel. In an embodiment, when input from the wireless mouse scroll wheel is received at the wireless mouse microcontroller, the wireless mouse microcontroller wakes up and executes the actuation/engagement sensor as described herein. A fourth triggering event could include signals received from another actuation/engagement sensor. In an embodiment, the actuation/engagement sensor is an IR camera or sensor that detects the presence of the user at the wireless mouse. In another embodiment, the actuation/engagement sensor is a motion sensor or a capacitive touch sensor that detects presence of a user or touch of a user at or on the wireless moues. It is appreciated that the wireless mouse microcontroller, executing the mouse actuation/engagement agent, may receive input from any of these sensors and/or from any motion sensor, movement tracker, or mouse button in order to trigger the wireless mouse microcontroller to wake up.

At block 745, therefore, the wireless mouse microcontroller determines whether mouse movement, mouse button actuation, wireless mouse scroll wheel rotation, or user presence has been detected. Where mouse movement, wireless mouse scroll wheel rotation, mouse button actuation, or user presence has not been detected, the method moves to block 750 with the wireless mouse microcontroller being maintained in the standby mode and the ultracapacitor continuing to provide power to the wireless mouse. However, as described herein, the ultracapacitor itself may run out of power prior to the user reengaging with the wireless mouse. As such, at block 755, the wireless mouse microcontroller determines, via the wireless mouse PMU, whether the available power in the ultracapacitor has been drained or not. If the power in the ultracapacitor has not been drained, the method 700 proceeds to block 750 as described herein.

Where the power has been drained from the ultracapacitor as determined at block 755 or where the mouse has been moved by a user, the mouse button actuated, wireless mouse scroll wheel rotated, or another user engagement at the wireless mouse is detected at block 745, the method 700 proceeds to block 760. At block 760 the wireless mouse microcontroller, with the wireless mouse PMU, switches the power source from the ultracapacitor to the wireless mouse battery. Again, as described herein, by including the ultracapacitor and the click haptic solenoid energy harvester device within the wireless mouse, power is conserved at the wireless mouse battery thereby reducing the frequency at which the user has to replace the wireless mouse battery. This not only reduces the costs associated with operating the wireless mouse but also reduces the number of batteries that need to be disposed of or recycled thereby reducing the environmental impact due to the operation of the wireless mouse.

At block 765, the method 700 includes determining whether the wireless mouse is still initiated. Where the wireless mouse is still initiated, the method 700 proceeds to block 710 to perform the methods described herein. Where the wireless mouse is no longer initiated, the method 700 may end.

The blocks of the flow diagrams of FIG. 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A wireless mouse operatively couplable to an information handling system comprising:
   a wireless mouse microcontroller;
   a wireless mouse power management unit (PMU) to
      provide power to the wireless mouse microcontroller and the wireless mouse PMU operatively coupled to a battery and an ultracapacitor;
a click haptic solenoid energy harvester device operatively coupled to the wireless mouse PMU and placed under a wireless mouse button, the click haptic solenoid energy harvester device comprising a wire coil with a magnet placed within the wire coil and a striking arm to interface with a mouse button plate formed on the wireless mouse button, where, the striking arm urges the magnet through the wire coil when the wireless mouse button is pressed down to generate charge to charge the ultracapacitor; and
the wireless mouse microcontroller to determine when input has been received at the wireless mouse when the wireless mouse has been moved based on input from an actuation/engagement sensor and, with the wireless mouse PMU, maintain a power source at a battery when the wireless mouse is in an active state and to determine when a threshold time period has expired since a user has last interacted with the mouse based on the wireless mouse engagement data received by the mouse actuation/engagement agent from the wireless mouse microcontroller to place the wireless mouse in a standby mode; and
the wireless mouse controller, with the wireless mouse PMU, to switch a power source to the ultracapacitor in the standby mode.

2. The wireless mouse of claim 1 further comprising:
the wireless mouse microcontroller to execute computer-readable program code to determine when a next input form the actuation/engagement sensor is received to switch to the active mode; and
the wireless mouse controller, with the wireless mouse PMU, to switch the power source back to the battery in the active mode.

3. The wireless mouse of claim 1 further comprising:
a bottom cap formed under the magnet; and
a spring formed under the bottom cap to return the magnet to a position prior to the wireless mouse button being pressed down with a rebound force and generate rebound haptics in the wireless mouse button.

4. The wireless mouse of claim 1 further comprising:
an optical light emitting diode (LED) movement sensor as an engagement/actuation sensor detecting movement input received at the wireless mouse microcontroller to indicate transition to or to maintain the active mode.

5. The wireless mouse of claim 1, wherein the magnet is urged through the wire coil of the click haptic solenoid energy harvester device in a downward movement due to the pressing of the wireless mouse button and in an upward movement due to a rebound force of a spring at a bottom of the magnet to cause the charge to be provided at the ultracapacitor.

6. The wireless mouse of claim 1 further comprising:
the wireless mouse microcontroller to, via the wireless mouse PMU, detect when the ultracapacitor has been drained of power and switch to the battery as a power source during the standby mode.

7. The wireless mouse of claim 1 further comprising:
a frame to hold the magnet and the wire coil under the wireless mouse button to maintain the striking arm below the mouse button plate, the frame operatively coupled to a housing of the wireless mouse; and
a raised edge on the striking arm to, when struck by the mouse button plate, generate a haptic click.

8. A method of operating a wireless mouse operatively couplable to an information handling system comprising:
charging an ultracapacitor operatively coupled to the wireless mouse PMU with a solenoid energy harvester device operatively coupled to the wireless mouse PMU and placed below a wireless mouse button, the click haptic solenoid energy harvester device comprising a wire coil with a magnet placed within the wire coil and a striking arm to interface with a mouse button plate formed on the wireless mouse button when the mouse button is pressed down, the striking arm urging the magnet through the wire coil to generate charge when the wireless mouse button is pressed down;
detecting, with the wireless mouse microcontroller, when a threshold period of time has expired since a user has last engaged with the wireless mouse based on mouse engagement data received from the wireless mouse microcontroller to place the wireless mouse in a standby mode and switching a power source to the ultracapacitor for the wireless mouse in the standby mode; and
detecting, with the wireless mouse microcontroller, actuation of the wireless mouse based on input data from an actuation/engagement sensor, and switching, with the wireless mouse PMU, the power source from the ultracapacitor to a battery.

9. The method of claim 8 further comprising:
a bottom cap formed under the magnet; and
a spring formed under the bottom cap to generate a rebound force to return the magnet to a position prior to the wireless mouse button being pressed down.

10. The method of claim 8 further comprising:
detecting the actuation from the user of the wireless mouse with an activation/engagement sensor that is a mouse movement sensor or a button switch unit formed in a housing of the wireless mouse.

11. The method of claim 8 further comprising:
actuating a switch unit with the wireless mouse button to provide input to the information handling system, the mouse button plate operatively coupled to a mouse button arm extending from the underside of the wireless mouse button; and
striking, with the mouse button plate, a raised edge on the striking area to generate click haptics while moving the magnet through the wire coil.

12. The method of claim 8, further comprising:
detecting, with the wireless mouse microcontroller and the mouse PMU, when the ultracapacitor has been drained of power and switch the power source to the battery during the standby mode.

13. The method of claim 8, wherein the click haptic solenoid energy harvester device further comprises a frame to hold the magnet and wire coil under the wireless mouse button to maintain the striking arm below the mouse button plate, the frame operatively coupled to a housing of the wireless mouse.

14. The method of claim 8, wherein passing of a magnet through wire coil of the click haptic solenoid energy harvester device in a downward movement due to the pressing of the wireless mouse button and in an upward movement due to a rebound force of a spring at a bottom of the magnet causes a charge to be provided at the ultracapacitor.

15. A wireless mouse comprising:
a wireless mouse microcontroller;
a wireless mouse power management unit (PMU) to provide power to the wireless mouse microcontroller and the wireless mouse PMU operatively coupled to a battery and an ultracapacitor;

a click haptic solenoid energy harvester device operatively coupled to the wireless mouse PMU and placed under a wireless mouse button, the click haptic solenoid energy harvester device comprising a wire coil with a magnet placed within the wire coil and a striking arm to interface with a mouse button plate formed on the wireless mouse button when the wireless mouse button is pressed down, where the striking arm urges the magnet down through the wire coil when the wireless mouse button is pressed down to charge the ultracapacitor;

a spring formed under the magnet in the solenoid energy harvester device to generate a rebound force to urge the magnet back up through the wire coil when the wireless mouse button is no longer pressed down; and the wireless mouse microcontroller to determine when a threshold time period has expired since a user has last engaged with the wireless mouse based on the mouse engagement data received to the wireless mouse microcontroller and place the wireless mouse in a standby mode and the wireless mouse PMU to switch a power source to the ultracapacitor.

16. The wireless mouse of claim 15 further comprising:

the wireless mouse microcontroller to detect when the user engages with the wireless mouse based on input from an actuation/engagement sensor and provide mouse engagement data to the wireless mouse microcontroller indicating presence of a user to switch a power source from the ultracapacitor to the battery.

17. The wireless mouse of claim 15, wherein passing of a magnet both down and up through wire coil of the click haptic solenoid energy harvester device causes a charge to be provided at the ultracapacitor to charge the ultracapacitor.

18. The wireless mouse of claim 15 further comprising:

the wireless mouse microcontroller to, via the mouse PMU, detect when the ultracapacitor has been drained of power and switch the power source to the battery during the standby mode.

19. The wireless mouse of claim 15 further comprising:

the striking arm having a raised edge to be struck by the mouse button plate to generate click haptics as well as urge the magnet down through the wire coil.

20. The wireless mouse of claim 15 further comprising:

a frame to hold the magnet and wire coil under the wireless mouse button to maintain the mouse button plate below the striking arm, the frame operatively coupled to a housing of the wireless mouse.

* * * * *